United States Patent
Ito et al.

(10) Patent No.: US 11,131,637 B2
(45) Date of Patent: Sep. 28, 2021

(54) ANALYSIS METHOD FOR FINE STRUCTURE, APPARATUS, AND PROGRAM

(71) Applicant: Rigaku Corporation, Akishima (JP)

(72) Inventors: Yoshiyasu Ito, Tachikawa (JP); Kazuhiko Omote, Akiruno (JP)

(73) Assignee: RIGAKU CORPORATION, Akishima (JP)

( * ) Notice: Subject to any disclaimer, the term of this patent is extended or adjusted under 35 U.S.C. 154(b) by 0 days.

(21) Appl. No.: 16/854,428

(22) Filed: Apr. 21, 2020

(65) Prior Publication Data
US 2020/0333268 A1 Oct. 22, 2020

(30) Foreign Application Priority Data
Apr. 22, 2019 (JP) .............................. JP2019-081274

(51) Int. Cl.
*G01N 23/201* (2018.01)
*G01N 23/20008* (2018.01)
*G01B 15/04* (2006.01)

(52) U.S. Cl.
CPC ........... *G01N 23/201* (2013.01); *G01B 15/04* (2013.01); *G01N 23/20008* (2013.01)

(58) Field of Classification Search
None
See application file for complete search history.

(56) References Cited

U.S. PATENT DOCUMENTS

| | | | |
|---|---|---|---|
| 8,908,830 B2 | 12/2014 | Omote et al. | |
| 9,297,772 B2 | 3/2016 | Fu et al. | |
| 2012/0087473 A1 | 4/2012 | Omote et al. | |
| 2015/0036805 A1 | 2/2015 | Fu et al. | |
| 2017/0074647 A1* | 3/2017 | Yamanaka | G01B 15/04 |

FOREIGN PATENT DOCUMENTS

| | | |
|---|---|---|
| JP | 2015-78988 A | 4/2015 |
| WO | WO 2010/119844 A1 | 10/2010 |

* cited by examiner

*Primary Examiner* — Hoon K Song
(74) *Attorney, Agent, or Firm* — Birch, Stewart, Kolasch & Birch, LLP

(57) ABSTRACT

Provided is an analysis method for a fine structure, that is capable of determining shapes of scattering bodies that are long in a thickness direction of a plate-shaped sample; and provided are an apparatus and a program thereof. There is provided an analysis method for a fine structure of a plate-shaped sample formed to have scattering bodies that are long in a thickness direction and periodically arranged, comprising the steps of preparing data of a scattering intensity from the plate-shaped sample measured via transmission of X-rays at a plurality of ω rotation angles; calculating a scattering intensity of the X-rays scattered by the plate-shaped sample under a specific condition; fitting the calculated scattering intensity to the prepared scattering intensity; and determining shapes of the scattering bodies for the plate-shaped sample, based on a result of the fitting.

11 Claims, 25 Drawing Sheets

Pitch variation
(fluctuation of hole position from ideal lattice point)

Diameter variation
(fluctuation of hole diameter)

Hole diameter=80 nm

Hole depth=3,000 nm

| Parameters | |
|---|---|
| $D_X$ (nm) | 80 |
| $D_Y$ (nm) | 80 |
| $\alpha$ | 0.8 |
| Depth (nm) | 3000 |
| Top SWA (deg) | 90.04 |
| Bot SWA (deg) | 89.96 |
| RT (nm) | 200 |
| RT offset (nm) | 14.3 |
| RB (nm) | 1500 |
| RB offset (nm) | 28.7 |
| Pitch variation (nm) | 1 |
| Diameter variation (nm) | 1 |
| Depth variation (nm) | 10 |

FIG. 13

Hole diameter=80 nm

Hole depth=3,000 nm

ANALYSIS METHOD FOR FINE STRUCTURE, APPARATUS, AND PROGRAM

TECHNICAL FIELD

The present invention relates to an analysis method for a fine structure via periodical arrangement of scattering bodies that are long in a thickness direction of a plate-shaped sample, and to an apparatus and a program thereof.

RELATED ART

Semiconductor devices have made a progress in microfabrication so far with a shallow groove pattern of 200 nm or less formed planarly, that is called a planar type. CD-SAXS of grazing angle incidence arrangement has been developed in order to meet needs of a shape measurement thereof (Refer to Patent Document 1).

However, it has reached the limit to improve an integration degree of a planar type semiconductor device, and thus it is accelerated to make the device be three-dimensional. It is like a change to a high-rise condominium from a single story house to make this device be three-dimensional. On a wafer plane of a semiconductor device with three-dimensional structure, deep groove patterns are formed having a pattern pitch of a depth of several μm or more for a dimension of 100 nm. The needs are getting stronger for measurement tools capable of simply and nondestructively measuring a pattern shape formed with grooves having such a high aspect ratio.

On the other hand, known is transmission type small angle X-ray scattering (tSAXS) that X-ray beam is irradiated to a substrate sample, the incident beam transmit the substrate and the scattered or diffracted beam is detected (Patent Document 2). For example, the apparatus described in Patent Document 2 amplifies a scattering intensity from the sample, and facilitates analyzing measurement of a pitch critical dimension, shape and fluctuation, when analyzing a structure in nanoscale by sub-nanometer wavelength X-ray radiation from a synchrotron X-ray source.

PATENT DOCUMENT

[Patent Document 1] WO 2010/119844
[Patent Document 2] Japanese Unexamined Patent Application Publication No. 2015-78988

Even though CD-SAXS of the grazing angle incidence arrangement is applied to patterns formed with a groove of several μm or more as described above, no sufficient result is obtained. That is, (1) the entering depth of X-rays is not sufficient, and (2) neither parallelism of incident X-rays to sufficiently observe interference fringes corresponding to a depth of several μm, nor angular resolution per pixel of a detector is obtained.

In contrast, a region having a sufficiently small Qz needs to be measured to observe the interference fringes corresponding to a depth of several μm. Transmission type CD-SAXS is suitable for realizing the foregoing. For this reason, it has been accelerated to develop an apparatus thereof.

In general, an X-ray small angle scattering pattern is given by the square of an absolute value of Fourier transformation of an electron number density distribution. However, phase information is missing in the X-ray small angle scattering pattern, and thus the electron number density distribution, that is, shapes of scattering bodies in a real space cannot be directly determined by inverse Fourier transformation.

Then, according to the analysis of conventional X-ray small angle scattering, the shapes of scattering bodies are approximated by a simple spherical shape, a cylindrical shape, a cuboid or the like to determine the dimension thereof.

On the other hand, the pattern shape applied to an actual device in processing is more complicated, and thus it is insufficient only to determine the dimension approximated by a simple model. It is necessary that not only typical dimensions such as CD of a pattern and depth, but also distinctive parameters of another pattern can be measured with high accuracy. That is, according to a side wall angle and a round shape of a hole, accuracy in absolute value and measurement reproducibility thereof are desired to be acquired.

SUMMARY OF THE INVENTION

The present invention has been made in view of such a situation, and it is an object to provide an analysis method for a fine structure, that is capable of determining shapes of scattering bodies that are long in a thickness direction of a plate-shaped sample; and to provide an apparatus and a program thereof.

(1) In order to achieve the above-described object, it is a feature that the analysis method according to the present invention is an analysis method for a fine structure of a plate-shaped sample formed to have scattering bodies that are long in a thickness direction and periodically arrange, comprising the steps of preparing data of a scattering intensity from the plate-shaped sample measured via transmission of X-rays at a plurality of co rotation angles; calculating a scattering intensity of the X-rays scattered by the plate-shaped sample under a specific condition; fitting the calculated scattering intensity to the prepared scattering intensity; and determining shapes of the scattering bodies for the plate-shaped sample, based on a result of the fitting. In this manner, a scattering intensity of X-rays is measured by transmission of the X-rays with the plate-shaped sample, and thus shapes of the scattering bodies that are long in a thickness direction can be determined.

(2) Further, it is a feature that the analysis method according to the present invention is the analysis method, wherein the calculated scattering intensity of the X-rays is calculated by assuming a shape model in which the scattering bodies specified by parameters are periodically arranged in a direction parallel to a surface of the plate-shaped sample. Consequently, the optimum values of parameters of the scattering bodies can be easily determined.

(3) Further, it is a feature that the analysis method according to the present invention is the analysis method, wherein the calculated scattering intensity of the X-rays is calculated under a condition that the scattering bodies are formed by laminating layers having respective shapes in the thickness direction of the plate-shaped sample. Consequently, shapes of the scattering bodies in complicated shape can be determined with high accuracy and robustness.

(4) Further, it is a feature that the analysis method according to the present invention is the analysis method, wherein each layer of the scattering bodies is specified by a center position and a size of a cross-sectional shape. Consequently, the complicated shape can be represented by the cross-sectional shape, the center position and the size.

(5) Further, it is a feature that the analysis method according to the present invention is the analysis method, wherein the plate-shaped sample is formed from a multilayer film. The feature of an actual sample can be precisely captured by assuming laminated scattering bodies for a sample formed from a multilayer film in this manner.

(6) Further, it is a feature that the analysis method according to the present invention is the analysis method, wherein the fitting is performed under a constraint condition that adjacent layers among the layers are seamlessly connected with each other. Consequently, a simulation result is easily made to be settled, and thus the result close to the actual shape is obtained while suppressing a calculation load.

(7) Further, it is a feature that the analysis method according to the present invention is the analysis method, wherein the plate-shaped sample is formed of silicon, and the scattering bodies each have a length of 200 nm or more and 20 μm or less. Even though being a plate-shaped sample formed of silicon in this matter, shapes of the scattering bodies that are long in the thickness direction can be specified by utilizing scattering associated with transmission of X-rays.

(8) Further, it is a feature that the analysis apparatus according to the present invention is an analysis apparatus for a fine structure of a plate-shaped sample formed to have scattering bodies that are long in a thickness direction and periodically arranged, comprising a measurement data storage section that stores data of a scattering intensity from the plate-shaped sample measured via transmission of X-rays at a plurality of co rotation angles; an intensity calculation section that calculates a scattering intensity of the X-rays scattered by the plate-shaped sample under a specific condition; a fitting section that fits the calculated scattering intensity to the stored scattering intensity; and a parameter determination section that determines shapes of the scattering bodies for the plate-shaped sample, based on a result of the fitting. Consequently, the shapes of the scattering bodies that are long in the thickness direction can be determined.

(9) Further, it is a feature that the analysis program according to the present invention is an analysis program for a fine structure of a plate-shaped sample formed to have scattering bodies that are long in a thickness direction and periodically arranged, the program causing a computer to execute the processes of preparing data of a scattering intensity from the plate-shaped sample measured via transmission of X-rays at a plurality of co rotation angles; calculating a scattering intensity of the X-rays scattered by the plate-shaped sample under a specific condition; fitting the calculated scattering intensity to the prepared scattering intensity; and determining shapes of the scattering bodies for the plate-shaped sample, based on a result of the fitting. Consequently, the shapes of the scattering bodies that are long in the thickness direction can be determined.

According to the present invention, the shapes of scattering bodies that are long in a thickness direction of a plate-shaped sample can be determined.

BRIEF DESCRIPTION OF THE DRAWINGS

FIG. 13 is a table showing parameters of a pattern determined by using a shape model.

DETAILED DESCRIPTION OF EMBODIMENTS

Figure 1:
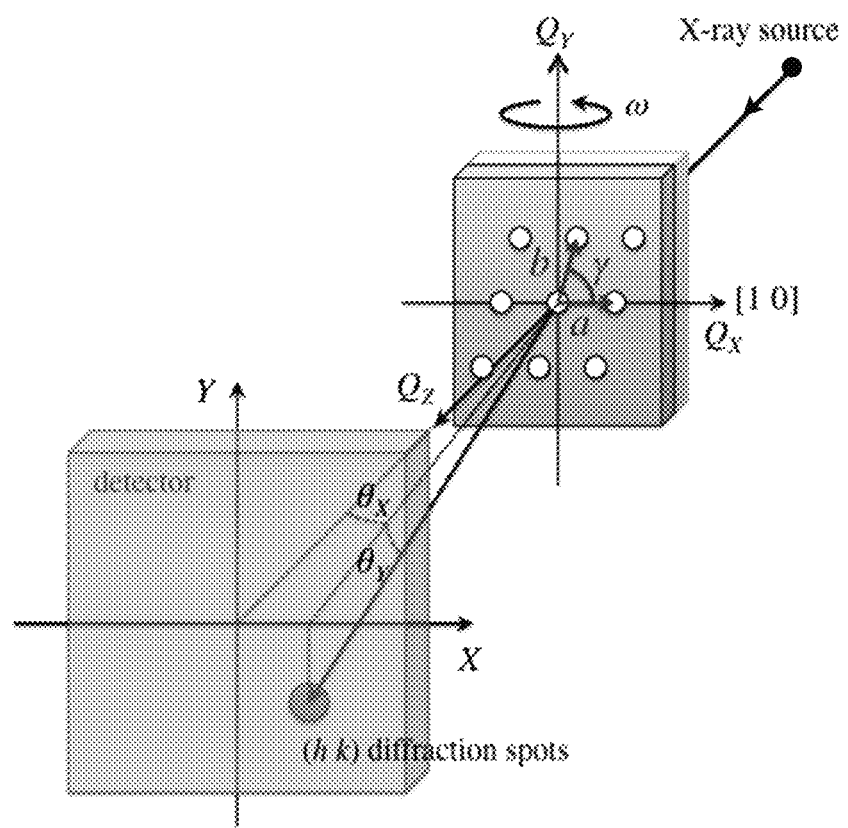
FIG. 1 is a perspective view showing a measurement system of transmission type CD-SAXS.

Next, embodiments of the present invention are described referring to the drawings. In order to facilitate understanding of the description, reference number indicating the same constituent element will be used as same and overlapping descriptions will be omitted in each drawing.

[Basic Method]

According to the present invention, shapes of scattering bodies of a sample and so forth are analyzed by transmission type CD-SAXS executable at a laboratory level. Specifically, it is suitable for analyzing shapes of semiconductor devices with deep groove microfabrication patterns such as three-dimensional NAND and DRAM, and so forth.

As to a shape analysis, the shapes of a fine pattern are expressed by appropriate shape parameters {average sizes (diameters) of holes and pillars, depth/height, a side wall angle, a round shape, and so forth}, and the shape parameters are determined by performing fitting between an experimental result and a calculation result. As a result of this, cross-sectional shape and definition parameters can be determined. The analysis having high measurement reproducibility can be realized by this method, if the actual pattern shape can be sufficiently expressed by a selected model.

When the shape of a fine pattern cannot be expressed by a simple shape model, the analysis can be carried out by finely slicing it in the depth direction, and giving only diameter and positional fluctuation to individual depths as parameters. Such a method may be called a "model-free" analysis for convenience, since no shape model is used. The arbitrariness of solution is predicted to be inferior to the model analysis, but more robust shape analysis can be realized.

The present invention is effective for nondestructively and simply measuring a deep groove fine pattern having a very large aspect ratio. It is specifically preferable when analyzing a structure buried in a substrate. As to shape measurement of deep groove patterns, the measurement is highly requested even for recent three-dimensional semiconductor devices, and can largely contribute to in-line measurements of the three-dimensional semiconductor devices if the present method is used. Next, specific embodiments are described.

[Transmission Type and Reflection Type]

FIG. 1 is a perspective view showing a measurement system of transmission type CD-SAXS. In the transmission type CD-SAXS, a sample rotation (ω rotation) is performed around a direction where X-rays perpendicularly enter a sample surface as a reference to measure sample rotation angle dependency of an integrated intensity for each diffraction line. It is because information in the depth direction is acquired by changing a scattering vector $Q_Z$ to perform the sample rotation {Refer to $Q_Z$ in Formula (1)}.

When there is a unit lattice having lattice constants represented by a and b and a grating angle represented by γ, the diffraction condition of diffraction indices (h, k) is given using scattering vectors $Q_X$, $Q_Y$ and $Q_Z$, as described below.

$$\begin{cases} Q_X = 2\pi \dfrac{h}{a} \\ Q_Y = 2\pi \left( -\dfrac{h}{a\tan\gamma} + \dfrac{k}{b\sin\gamma} \right) \\ Q_Z \approx -Q_X \tan\omega \end{cases} \quad (1)$$

Based on Formula (1), Formula (2) is obtained by determining $\Delta Q_Z$ when h=1.

$$\Delta Q_Z \approx \dfrac{2\pi}{a} \Delta\omega (h=1) \quad (2)$$

For example, for a semiconductor device, a corresponds to a pattern pitch, and is approximately 10 to 100 nm. Further, there is the following relationship between a depth H and a period $\Delta Q_Z$ of an interference pattern in the $Q_Z$ direction.

$$H = \dfrac{2\pi}{\Delta Q_Z} \quad (3)$$

Accordingly, $\Delta Q_Z$ needs to be small in order to measure a deep pattern.

On the other hand, according to a reflection type CD-SAXS, expected is a measurement system in which the scattering intensity is measured with a plate-shaped sample at a rotation angle β around a rotation axis φ perpendicular to the surface of the plate-shaped sample by making X-rays enter the surface of the plate-shaped sample at a grazing incident angle α. In this case, the diffraction condition is calculated as described below.

$$\begin{cases} Q_X = 2\pi \dfrac{h}{a} \\ Q_Y = 2\pi \left( -\dfrac{h}{a\tan\gamma} + \dfrac{k}{b\sin\gamma} \right) \\ Q_Z \approx \dfrac{2\pi}{\lambda} (\sin\alpha + \sin\beta) \end{cases} \quad (4)$$

Then, based on Formula (4), Formula (5) is obtained by determining $\Delta Q_Z$.

$$\Delta Q_Z \approx \dfrac{2\pi}{\lambda} \Delta\beta \quad (5)$$

Δβ is represented as described below by using a pixel size p and a camera length L.

$$\Delta\beta = \tan^{-1}\left(\dfrac{p}{L}\right) \quad (6)$$

The camera length L is generally 500 to 700 mm, and the typical pixel size is approximately 0.1 mm. The Δβ can be reduced by using a detector of a small pixel size.

Given that a is 10 to 100 nm in Formula (2) and a wave length λ of X-rays is approximately 0.1 nm in Formula (5), $\Delta Q_Z$ in a transmission type is 100 to 1000 times larger than $\Delta Q_Z$ in a reflection type. Accordingly, the transmission type measurement is effective for deep holes or deep grooves, and the reflection type measurement is effective for shallow holes or shallow grooves of the surface.

Characteristics of CD-SAXS of each of the transmission type and the reflection type are given as shown in the following table.

|  | Transmission type | Reflection type |
| --- | --- | --- |
| Measurable depth | more than 200 nm | less than 200 nm |
| Preferable shape of hole/groove | a depth of 1 μm or more | a depth of 100 nm or less |
| Wavelength of applied X-rays | MoKα (0.071 nm) | CuKα (0.154 nm) |
| Refraction/reflection at interface | unaffected | affected |
| Lower layer pattern | affected | little affected |

In addition, in reflection type measurement with grazing angle incidence, no X-ray basically reaches the interface of a deep hole or a deep groove of several μm or more by absorption thereof. On the other hand, according to a transmission type method, X-rays pass through the substrate.

[Principle and Calculation of Formula]

(X-Ray Small Angle Scattering Intensity)

In the transmission type CD-SAXS affected little by refraction or multiple reflections as described above, the X-ray small angle scattering intensity I(Q) can be calculated by Born approximation {the square of an absolute value of Fourier transformation of an electron number density distribution ρ (r in the entire system}, as shown in Formula (7).

$$I(Q) = \left| \int_V \rho(r) e^{-iQ \cdot r} dr \right|^2 \quad (7)$$

Figure 2A:
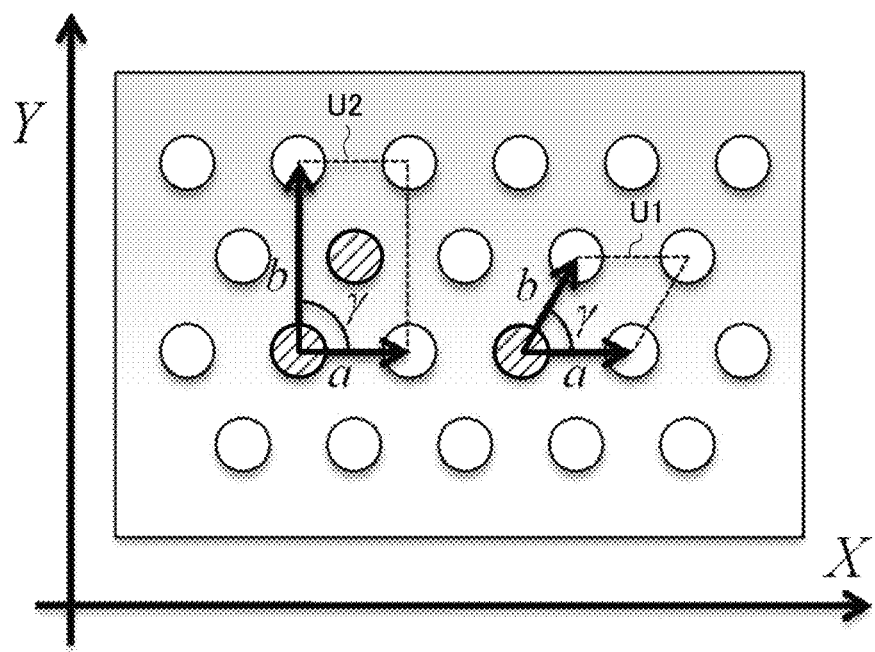
FIGS. 2A and 2B are an XY sectional view and an XZ sectional view each in which a plate-shaped sample is represented by an electron number density distribution, respectively.
Figure 2B:
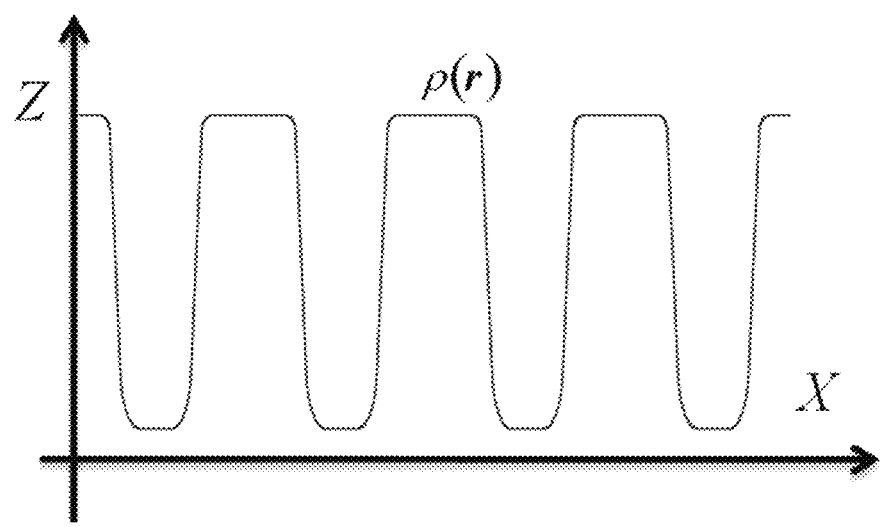

FIGS. 2A and 2B are respectively an XY sectional view and an XZ sectional view each in which a plate-shaped sample is represented by an electron number density distribution. As shown in FIGS. 2A and 2B, when scattering bodies have a periodical pattern, the amplitude of scattering X-rays can be expressed by the product of an integral concerning a unit lattice and a Laue function L, as shown in Formula (8).

$$\int_V \rho(r)e^{-iQ\cdot r}dr = \qquad (8)$$

$$\int_{Unit\ cell} \rho(r)e^{-iQ\cdot r}dr \times \sum_{l,m}^{Surface} e^{-i(Q_X x_j + Q_Y y_m)} = \int_{Unit\ cell} \rho(r)e^{-iQ\cdot r}$$

$$dr \times \frac{\sin(N_X Q_X a/2)\sin(N_Y(Q_X\cos\gamma + Q_Y\sin\gamma)b/2)}{\sin(Q_X a/2)\sin((Q_X\cos\gamma + Q_Y\sin\gamma)b/2)} =$$

$$\int_{Unit\ cell} \rho(r)e^{-iQ\cdot r}dr \times L(Q)$$

Then, $Q_X$ and $Q_Z$ satisfying the diffraction condition are derived from Laue function.

$$\begin{cases} Q_X = 2\pi\dfrac{h}{a} \\ Q_Y = 2\pi\left(-\dfrac{h}{a\tan\gamma} + \dfrac{k}{b\sin\gamma}\right) \end{cases} \qquad (9)$$

(How to Set a Unit Lattice)

As shown in FIG. 2A, the unit lattice may be set by a simple lattice U1 so as to minimize the area of the unit lattice, or may also be set by a lattice U2 that is easy to be set. In FIG. 2A, an independent site of each unit lattice is shown by a hatched circle. When each site having common electronic density distribution and shape, an integral within a unit lattice representing a scattering amplitude inside the unit lattice can be described by the product of a scattering body form factor F and a structure factor S as an integral of one scattering body.

$$\int_{Unit\ cell} \rho(r)e^{-iQ\cdot r}dr = \int_{Scatter} \rho(r)e^{-iQ\cdot r}dr \times \sum_j^{Unit\ cell} e^{-i(Q_X x_j + Q_Y y_j)} \qquad (10)$$

$$= F(Q) \times S(Q)$$

The structure factor S can also be expressed as below, using Miller indices (h k) and relative coordinates ($x'_j$, $y'_j$) inside a unit lattice.

$$S(h, k) = \sum_j^{Unit\ Cell} e^{-i2\pi(h\cdot x'_j + k\cdot y'_j)} \qquad (11)$$

In the case of a simple lattice U1, the independent site is only (0, 0), and the structure factor is 1, irrespective of (h k). In the case of a face-centered lattice, independent sites are (0, 0) and (½, ½), and the structure factor becomes 2 when h+k is an even number and the structure factor becomes 0 when h+k is an odd number. The Laue function L and the structure factor S are associated with the arrangement of scattering bodies, and are do not depend on shapes of the scattering bodies. Then, when the pattern structure of scattering bodies is determined by a mask pattern in such a semiconductor device, no pattern structure needs to be daringly determined by CD-SAXS. It is particularly important to specify shapes {electron number density distribution r (r)} of scattering bodies.

The factor concerning shapes of the scattering bodies is none other than the form factor F that is a form integral of the scattering bodies.

$$F(Q) = \int_{Scatter} \rho(r)e^{-iQ\cdot r}dr \qquad (12)$$

In the case that an electron number density distribution of each scattering body is a uniform electron number density $\rho_0$, the form factor F can also be replaced with the following form integral.

$$F(Q) = \rho_0 \int_{Scatter} e^{-iQ\cdot r}dr \qquad (13)$$

For example, when a cylinder having a radius R and a length H stands in the Z direction, the form factor is given as below.

$$F(Q; R, H) = \rho_0 \int_{-\frac{H}{2}}^{\frac{H}{2}} dz \int_0^R dr \int_0^{2\pi} re^{-i(Q_R r\cos\theta + Q_Z z)} d\theta = \qquad (14)$$

$$\frac{4\pi R}{Q_R Q_Z} J_1(Q_R R)\sin\left(\frac{Q_Z H}{2}\right)$$

$$\because Q_R = \sqrt{Q_X^2 + Q_Y^2}$$

There are many cases where actual shapes of the scattering bodies are not approximated by a simple shape such as a cylinder or the like. For example, it is possible to represent a form factor including the parameters by incorporating a side wall angle, a round parameter or the like into a shape model. Alternatively, it appears that a model-free analysis for performing analysis using a form factor obtained by incorporating only a diameter and a center position thereof into parameters for every slice layer by being sliced in the depth direction is effective.

In any case, shapes are not directly given from experimental data, but model parameters are refined to determine the shapes in such a manner that calculation data in which the model parameters are used as variables is identical with the experimental data.

$$\int_{Unit\ cell} \rho(r)e^{-iQ\cdot r}dr = \int_{Scatter} \rho(r)e^{-iQ\cdot r}dr \times \sum_j^{Unit\ cell} e^{-i(Q_X x_j + Q_Y y_j)} \qquad (15)$$

$$= F(Q) \times S(Q)$$

$$\begin{cases} x_j = \bar{x}_j + \Delta x \\ y_j = \bar{y}_j + \Delta y \end{cases} \qquad (16)$$

$$\sum_{j}^{Unit\ cell} e^{-i(Q_X x_j + Q_Y y_j)} \rightarrow \sum_{j}^{Unit\ cell} e^{-i(Q_X(x_j + \Delta x) + Q_Y(y_j + \Delta x))} = \qquad (17)$$

$$e^{-i(Q_X \Delta x + Q_Y \Delta y)} \sum_{j}^{Unit\ cell} e^{-i(Q_X \bar{x}_j + Q_Y \bar{y}_j)} =$$

$$\left( \int_{-\infty}^{\infty} e^{-iQ_X x} \frac{1}{\sqrt{2\pi}\sigma_X} e^{-\frac{1}{2}\left(\frac{x}{\sigma_X}\right)^2} dx \right)$$

$$\left( \int_{-\infty}^{\infty} e^{-iQ_Y y} \frac{1}{\sqrt{2\pi}\sigma_Y} e^{-\frac{1}{2}\left(\frac{y}{\sigma_Y}\right)^2} dy \right) \sum_{j}^{Unit\ cell} e^{-i(Q_X \bar{x}_j + Q_Y \bar{y}_j)} =$$

$$e^{-\frac{1}{2}(\sigma_X^2 Q_X^2 + \sigma_Y^2 Q_Y^2)} \sum_{j}^{Unit\ cell} e^{-i(Q_X \bar{x}_j + Q_Y \bar{y}_j)}$$

In Formula (17), the factor represented by the sum symbols for the unit cell corresponds to a structure factor S(Q) {Refer to Formula (15)}. On the other hand, temperature factors by thermal vibration in crystallography correspond to the integral terms in the X direction and the Y direction in Formula (17), and correspond to a part shown in Formula (18).

$$e^{-\frac{1}{2}(\sigma_X^2 Q_X^2 + \sigma_Y^2 Q_Y^2)} \qquad (18)$$

When representing a pattern shape, this factor represents statically positional fluctuation. A model analysis or a model-free analysis for specifying parameters such as shapes of scattering bodies, the positional fluctuation and so forth is made possible by using a formula representing an X-ray scattering intensity with transmission type CD-SAXS, that is determined as described above. [Model analysis]

Figure 3A:
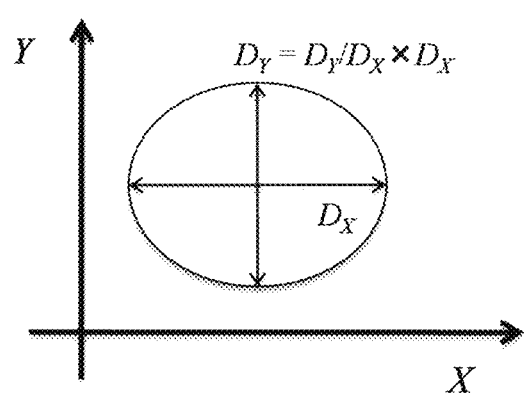
FIGS. 3A and 3B are an XY sectional view and an XZ sectional view that show shape models, respectively.
Figure 3B:
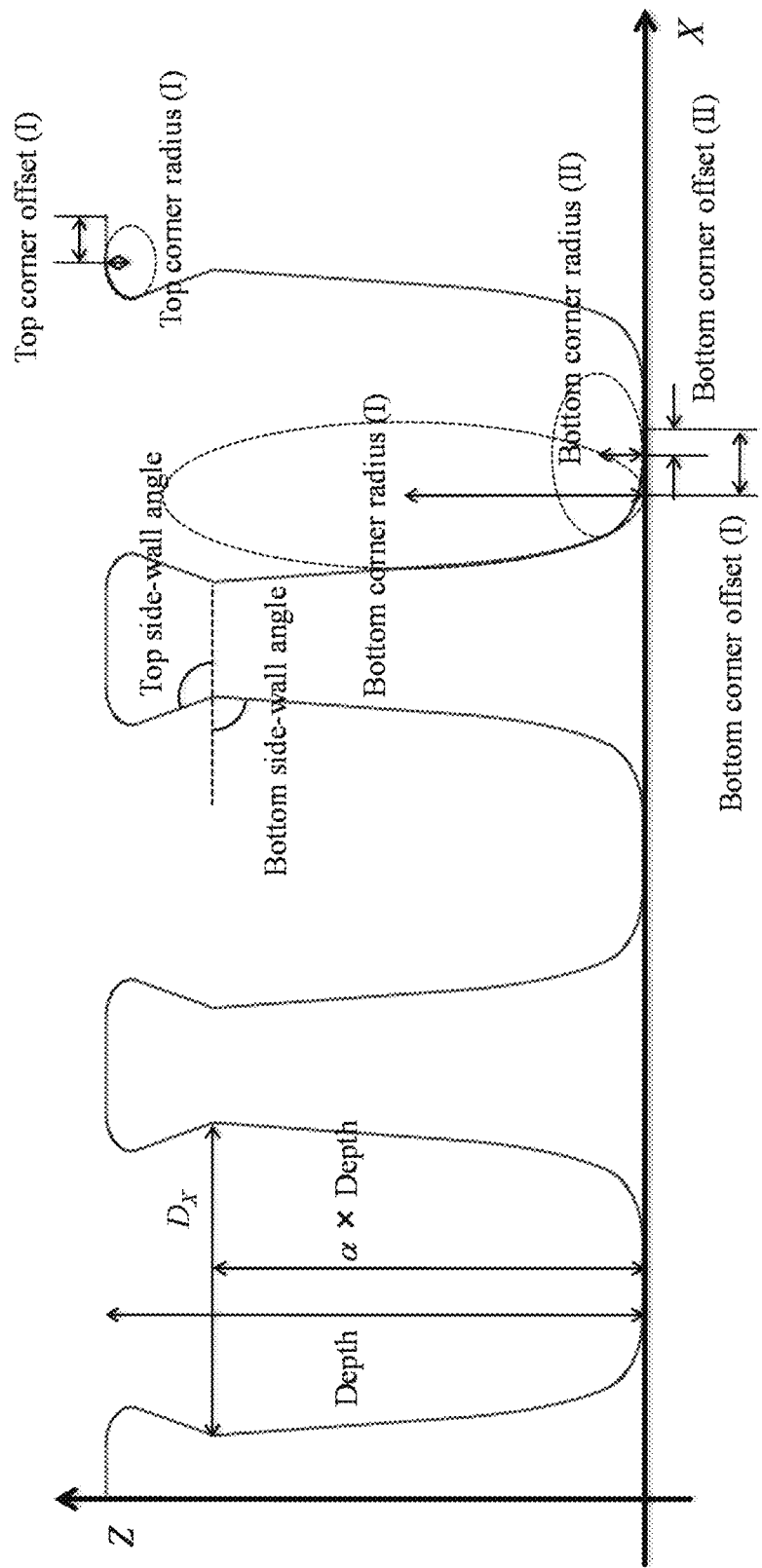

The scattering intensity of X-rays with a plate-shaped sample can be calculated by assuming a state where scattering bodies represented by a shape model are periodically arranged in a direction parallel to the surface of the plate-shaped sample. FIGS. 3A and 3B are respectively an XY sectional view and an XZ sectional view that show shape models. As shown in FIGS. 3A and 3B, parameters of the scattering bodies can be determined by fitting, using a shape model represented by the parameters.

Examples of parameters include a diameter DX in the X-direction of scattering bodies, a diameter DY in the Y direction, a ratio α of a bottom side length to a depth, a depth, a side wall angle at the upper portion (TopSWA), a side wall angle at a bottom portion (BotSWA), an angular radius at an upper portion (RT), offset of the angular radius at the upper portion (RToffset), an angular radius at a bottom portion (RB), offset of the angular radius at the bottom portion (RBoffset), pitch variation, diameter variation, and depth variation.

Figure 4A:
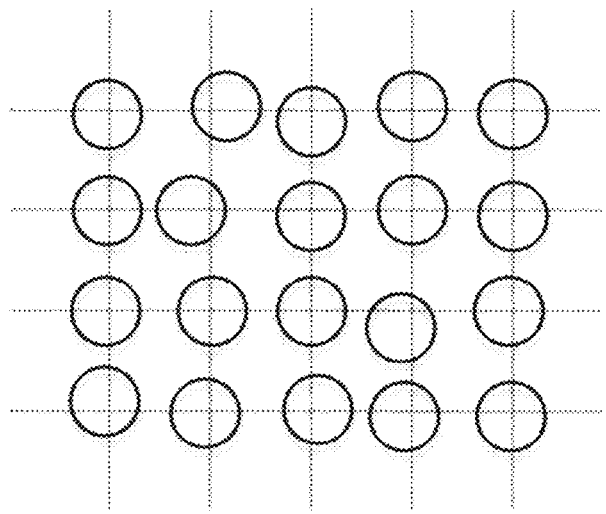
FIGS. 4A and 4B are plane sectional views showing pitch variation and diameter variation of holes of a plate-shaped sample, respectively.
Figure 4B:
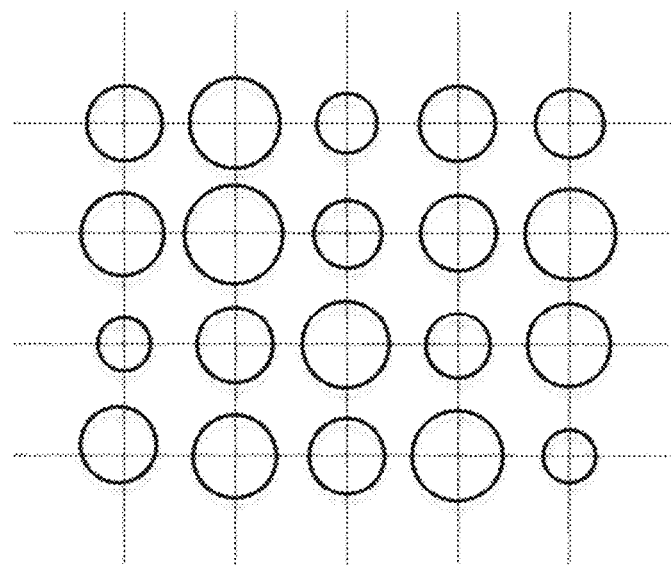

FIGS. 4A and 4B are plane sectional views showing respectively pitch variation and diameter variation of holes of a plate-shaped sample. As shown in FIGS. 4A and 4B, variations produced to pitches and diameters of holes can also be represented by parameters, and these can be determined by the analysis.

[Model-Free Analysis]

The complicated pattern shape is generated by slight variation in a processing condition with respect to a pattern with holes having a high aspect ratio. Accordingly, in some cases, there are provided more complicated pattern shapes that cannot be expressed only by the above-described dimensions and distinctive parameters. It is preferable to be able to realize the shape measurement with high robustness with respect to such a pattern.

Figure 5A:
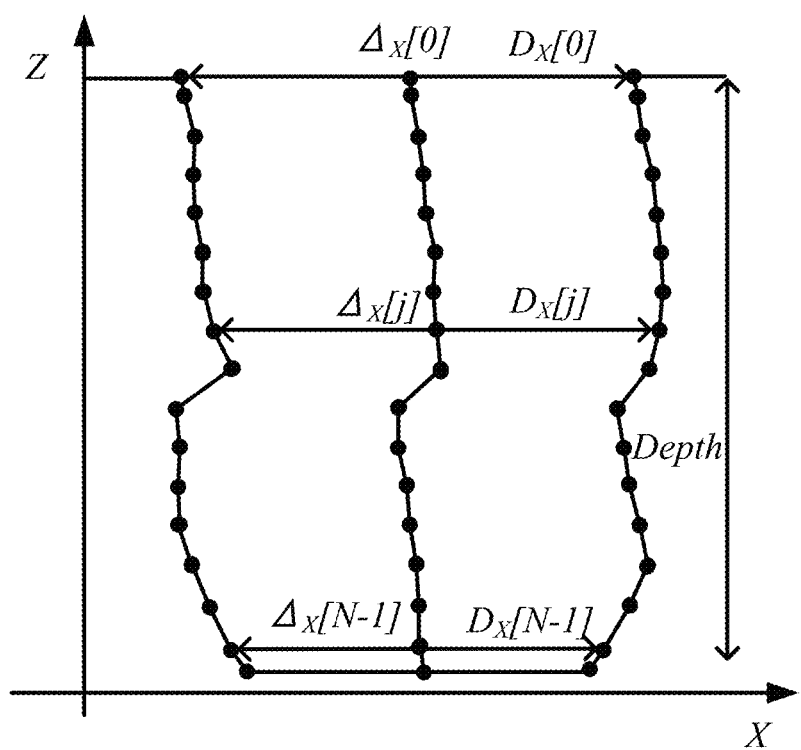
FIGS. 5A and 5B are diagrams showing hole shapes on an XZ plane and a YZ plane showing analysis conditions, respectively.
Figure 5B:
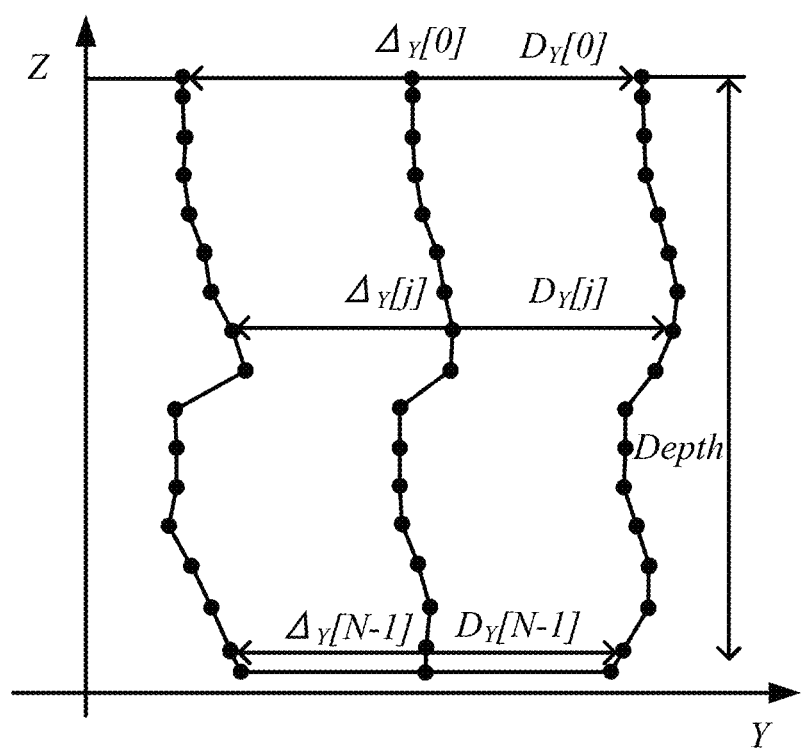

The scattering intensity of X-rays with a plate-shaped sample can also be calculated under the condition of being formed by laminating layers in which scattering bodies have respective shapes in the thickness direction of the plate-shaped sample. As an example of these model-free analysis in which a shape model is not used, it appears that a hole depth is used as a parameter, and the layer is sliced into N equal parts in the depth direction. FIGS. 5A and 5B are diagrams showing hole shapes respectively on an XZ plane and a YZ plane showing analysis conditions.

Each slice layer of scattering bodies is preferably specified by a center position and size of a cross-sectional shape. In this manner, a complicated shape can be represented by the cross-sectional shape, the center position and the size. For example, as shown in FIGS. 5A and 5B, hole diameters in the X direction and the Y direction of each layer are given as parameters ($D_X$, $D_Y$). Further, center position displacements of a hole in the X direction and the Y direction of each layer are given as parameters ($\Delta_X$, $\Delta_Y$).

The model-free analysis is specifically effective when the sample is made from a multilayer film. When a matrix layer is formed from a multilayer film structure, electron density of each slice layer can be used as a parameter. In such a case, no need is to be done into equal slices, and the film thickness of each layer may be used as a parameter. The shapes of scattering bodies in complicated shape can be determined with high accuracy and high robustness via fitting by calculating a scattering intensity under the condition where such a slice layer is used.

The layers adjacent in the lamination direction among slice layers are actually connected seamlessly with each other. Accordingly, fitting is preferably performed by providing a constraint condition of such continuity. Consequently, a simulation result is easily made to be settled, and thus the result close to the actual shape is obtained while a calculation load being suppressed.

(Example of Constraint Condition)

For example, in the least-squares method, the analysis is performed in such a manner that the sum of residual squares $\chi^2$ of experimental data and calculation data becomes minimum. However, when the number of slice layers being increased despite the fact that measurement sensitivity is insufficient, a degree of freedom is too high and parameters are not clearly determined, and thus there are some cases where a sawtooth-shaped cross-sectional surface that would never occur in reality is to be obtained. In such a case, as an example, weight can be added so as to minimize a path integral of the cross-section, as described below. The sum of residual squares $\chi^2$ with no path integral is given as shown in Formula (19).

$$\chi^2 = \sum_{j=0}^{N-1} (Obs_j - Calc_j)^2 \qquad (19)$$

$Obs_j$ and $Calc_j$ each represent j-th experimental data, and N represents the number of data points. The sum of residual squares $\chi^2$ to which the path integral is included in weight is given as shown in Formula (20).

$$\chi^2 = \sum_{j=0}^{N-1} (Obs_j - Calc_j)^2 + \qquad (20)$$

-continued $$\alpha \frac{1}{2\sum_{k=0}^{M-1} t_k} \sum_{k=0}^{M-2} (t_k + t_{k+1}) \left( \left| \frac{D_{X,k} - D_{X,k+1}}{2} + \Delta_{X,k} - \Delta_{X,k+1} \right| + \right.$$

$$\left| \frac{D_{X,k} - D_{X,k+1}}{2} - \Delta_{X,k} + \Delta_{X,k+1} \right| + \left| \frac{D_{Y,k} - D_{Y,k+1}}{2} + \right.$$

$$\left. \Delta_{Y,k} - \Delta_{Y,k+1} \right| + \left| \frac{D_{Y,k} - D_{Y,k+1}}{2} + \Delta_{Y,k} - \Delta_{Y,k+1} \right| \right)$$

Formula (20) shows the sum of residual squares $\chi^2$ to which the path integrals of respective cross-sections in the X direction and the Y direction. $D_{X,k}$ and $D_{Y,k}$ represent diameters in the X direction, and the Y direction of the k-th slice, respectively; $\Delta_{X,k}$ and $\Delta_{Y,k}$ represent position displacements in the X direction and the Y direction of the k-th slice layer, respectively; $t_K$ represents film thickness of the k-th slice layer; M represents the number of slice layers; and $\alpha$ represents a weighting parameter. For example, weight by which the sum of residual squares $\chi^2$ in this case is minimized can be added therein as a constraint condition.

[A Plurality of Rotation Angles ω]

Specifically, according to the model-free analysis, it is important that a plurality of pieces of diffraction image data obtained by rotating a sample are acquired in order to determine the cross-sectional shape. The angle range of a sample rotation co axis that is required for measurements, and sampling intervals are described below.

When spatial resolution in the depth direction is represented by $\Delta Z$, the maximum value $Q_{Z,Max}$ of $Q_Z$ required for measurements is given as shown below.

$$Q_{Z,Max} = \frac{2\pi}{\Delta Z} \quad (21)$$

Further, the range of $Q_Z$ obtainable with respect to the sample rotation co is proportional to is $Q_X$, and is given as shown below.

$$Q_Z = -Q_X \tan\omega, \quad (22)$$
$$Q_X = \frac{2\pi}{a} h$$

When a represents a pitch in the X axis direction, and $h_{Max}$ represents the maximum value of a diffraction index h used for analysis, the smallest sample rotation angle $\omega_{Min}$ to realize a spatial resolution $\Delta Z$ can be calculated as described below.

$$Q_{Z,Max} = \frac{2\pi}{\Delta Z} = -Q_{X,Max} \tan\omega_{Min} \quad (23)$$

$$\Rightarrow \omega_{Min} = \tan^{-1}\left(\frac{2\pi}{Q_{X,Max}\Delta Z}\right)$$

$$\Rightarrow \omega_{Min} = \tan^{-1}\left(\frac{a}{h_{Max}\Delta Z}\right)$$

For example, in the case of a=100 nm, $h_{Max}$=10 and $\Delta Z$=50 nm, a rotation amount of ω is 11.3°. According to the slice in the mode-free analysis, the estimated number of division can be calculated by inversely calculating $\Delta Z$ by the rotation amount ω. For example, when the spatial resolution in the depth direction represents $\Delta Z$, and H represents the depth of a measurement object, it is preferable that the estimated number of slice layers is made to be approximately H/$\Delta Z$.

The number of images according to the sample rotation corresponds to sampling intervals of ω rotation for imaging the images. The period $\Delta Q_Z$ of an interference pattern from scattering bodies having a depth H is calculated as described below.

$$\Delta Q_Z = \frac{2\pi}{H} \quad (24)$$

When the maximum $Q_X$ used for analysis is set as $Q_{X,Max}$ or the maximum diffraction index is set as $h_{Max}$ from the relationship between $Q_Z$ and $Q_X$, and the condition of ω<<1, the period $\Delta\omega$ of interference fringes is calculated as described below.

$$\Delta\omega \approx \frac{2\pi}{Q_{X,Max}H} = \frac{a}{h_{Max}H} \quad (25)$$

In the case of a=100 nm, $h_{Max}$=10 and H=4000 nm, the period $\Delta\omega$ of interference fringes becomes approximately 0.14°. It appears that sampling intervals need to be narrower than the period of interference fringes, for which an approximate value of ¼-⅕ of the period of interference fringes is good enough. Accordingly, it is preferable that the sampling intervals are approximately 0.03° to 0.04°. The number of photographed images of diffraction image data can be calculated from the rotation angle range of ω and sampling intervals. For example, according to the above-described example, photographing at an angle of ±11.3° is carried out at an interval of 0.04°, and thus 565 images may be photographed.

[Configuration of the Entire System]

Figure 6:
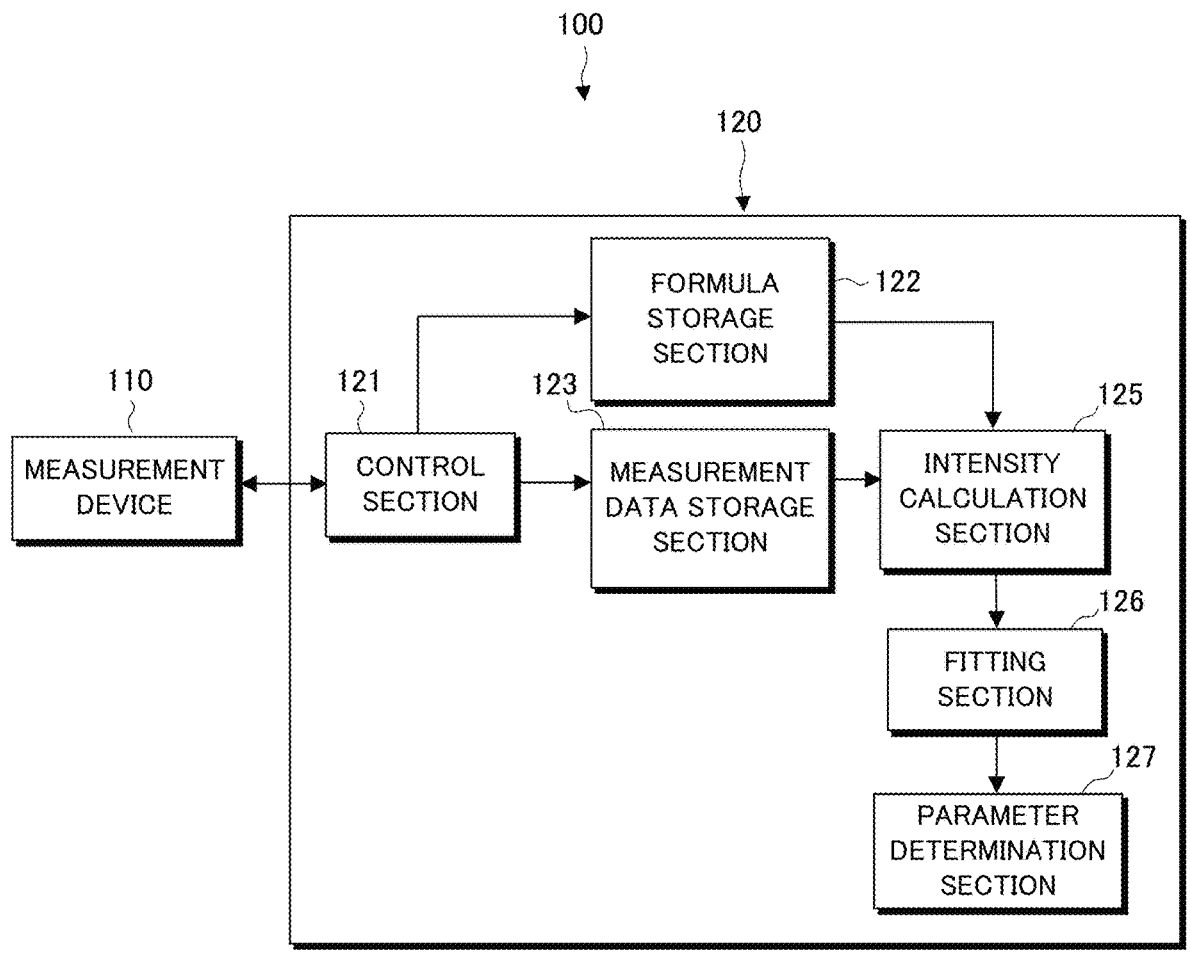
FIG. 6 is a block diagram showing a configuration of a measurement system according to the present invention.

FIG. 6 is a block diagram showing a configuration of a measurement system 100. The measurement system 100 comprising a measurement device 110 and an analysis apparatus 120 makes a transmission type CD-SAXS be measurable via measurement of a scattering intensity by exposing a plate-shaped sample to X-rays. The analysis apparatus 120 manages measurement data together with control data while controlling the measurement device 110, and enables analyzing the data. The specific configuration will be described below.

[Configuration of Measurement Device]

Figure 7:
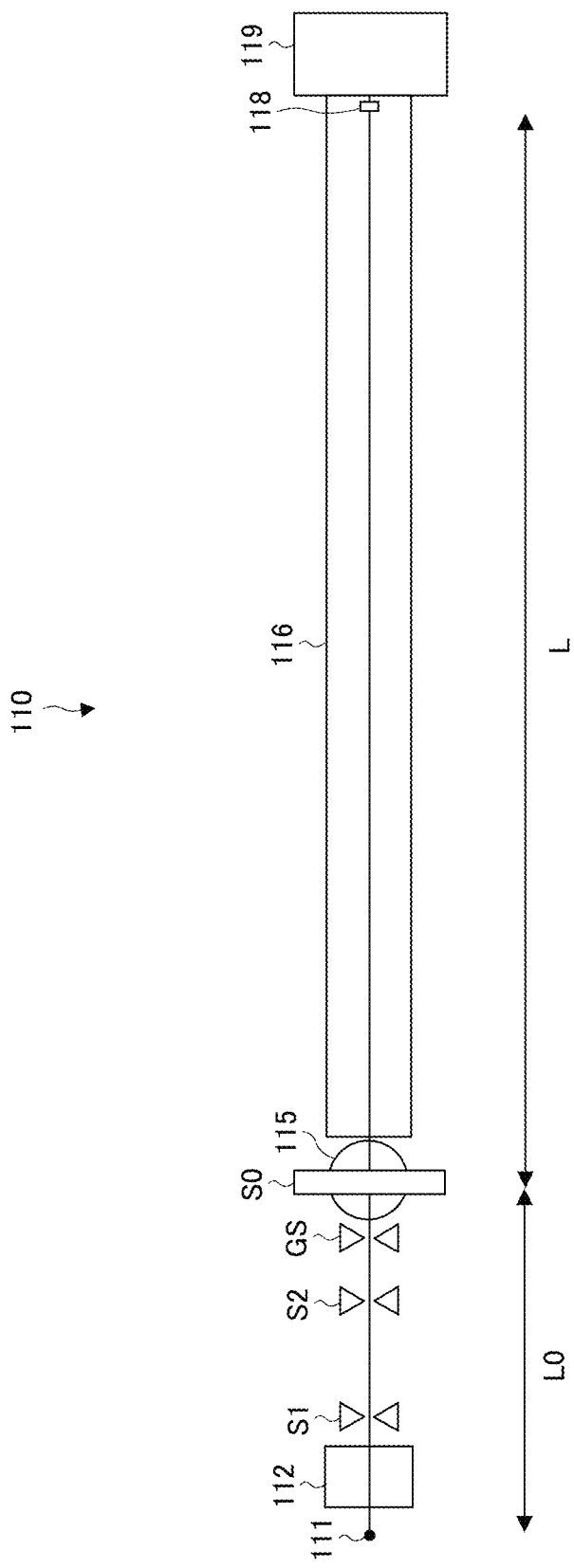
FIG. 7 is a plan view showing a configuration of a measurement device.

FIG. 7 is a plan view showing a configuration of the measurement device 110. The measurement device 110 comprises an X-ray source 111; a mirror 112; slits S1, S2 and GS; a sample stand 115; a vacuum path 116, a beam stopper 118; and a detector 119. The distance L0 from X-ray source 111 to the sample S0, and the camera length L can be set to, for example, 1000 mm and 3000 mm, respectively.

MoKα is usable as an X-ray source 111. The mirror 112 spectrally diffracts X-rays radiated from the X-ray source 111, and the spectrally diffracted X-rays are radiated in the direction of sample S0. The slits S1 and S2 each made from a member capable of shielding X-rays constitutes a slit section for narrowing the spectrally diffracted X-rays. According to such a configuration, it becomes possible to radiate X-rays at a plurality of rotation angles co close to the direction perpendicular to the surface of the plate-shaped sample S0. According to the plurality of rotation angles co, preferably selected are specific angles in the range between −10° and 10°. According to the slit GS, a spot size of X-rays on the sample surface can be limited to several ten μm or less. Basically, parasitic scattering generated at the slits S1 and S2 is eliminated using GS by determining the beam size at the slits S1 and S2. However, in the case of producing an extremely small spot, it is also possible to make the beam small at GS.

The sample stand 115 supporting the sample S0 on the stand is able to adjust azimuth of the plate-shaped sample S0 via a drive mechanism by receiving control of the analysis apparatus 120. Specifically, adjustable are not only ω rotation angles around $Q_Y$ as shown in FIG. 1 but also a χ rotation angle and a φ rotation angle. The angle at which spectrally diffracted X-rays are incident on the sample S0 can be changed by such an adjustment, and thus the scattering intensity can be measured according to the diffraction angle.

The sample S0 is formed into a plate shape, and scattering bodies are periodically arranged in the direction parallel to the main surface of the sample. For example, holes are exemplified as scattering bodies. That is, a typical sample is a silicon wafer substrate, in this case, the scattering bodies are holes that have been formed by etching. As the integration degree becomes higher, it is important to confirm formation of more accurate hole shape with respect to the specification.

In such a case, even though the scattering bodies have a length of 200 nm or more and 20 μm or less, shapes of the scattering bodies that are long in the thickness direction can be specified by utilizing scattering accompanied with transmission of X-rays by radiating the X-rays perpendicularly to the sample surface, as shown in FIG. 7.

The scattering bodies may be formed from pillars without limiting to the above-described holes. That is, the present invention can also be applied to a sample of a silicon substrate, on the surface of which cylinders are periodically formed. Further, used may be a sample on which line patterns (space patterns) like long molecular arrangement are formed.

According to the vacuum path 116, the path of a scattering beam is maintained in vacuum while gaining the camera length, in order to suppress attenuation of the scattering beam. The beam stopper 118 absorbs the direct beam. The detector 119 that is a two-dimensional semiconductor detector movable on the circumference from a sample position, for example, can detect the scattering intensity of X-rays. The measurement device 110 and the analysis apparatus 120 are connected to each other, and the detected scattering data is transmitted to the analysis apparatus 120.

In addition, it is preferable that the measurement device 110 comprises a laser light source, and a detector of reflection light. It is possible to adjust azimuth of a plate-shaped sample in such a manner that the surface of the plate-shaped sample becomes perpendicular to the incident direction of X-rays by using reflection of laser light. The azimuth adjusted in this manner can be used as a reference, resulting in ω=χ=0 in this case.

Even though having no reference when the cross-sectional shape of a sample is evaluated, analysis itself can be performed. However, an appropriate origin for an ω axis and a χ axis of geometer axes is merely used as a reference for the cross-sectional shape specified in this manner. In many cases of evaluating the cross-sectional shape, the cross-sectional shape needs to be evaluated by using the surface as a reference. In such a case, it is preferable that a reference for the surface is provided, and the measurement and analysis are subsequently performed.

[Configuration of Analysis Apparatus]

The analysis apparatus 120 constituted from PC provided with for example, a memory and a processor enables performing each processing by executing a program. It is made possible to analyze a fine structure of a plate-shaped sample formed to have scattering bodies that are long in the thickness direction and periodically arranged by processing measurement data obtained from the measurement device 110. The analysis apparatus 120 comprises a control section 121, a formula storage section 122, a measurement data storage section 123, an intensity calculation section 125, a fitting section 126, and a parameter determination section 127.

The control section 121 that controls the measurement device 110 manages the control data and the measurement data. For example, the control section 121 controls the sample stand 115 with the drive mechanism, and adjusts azimuth of the sample S0. The formula storage section 122 stores the formula for calculating the scattering intensity with respect to the specific shape model or analysis condition. The measurement data storage section 123 stores intensity data of X-rays scattered from the plate-shaped sample according to transmission of X-rays, that is measured at each of a plurality of rotation angles ω in the vicinity of the direction perpendicular to the surface of a plate-shaped sample.

The intensity calculation section 125 acquires the formula for calculating scattering with respect to a desired shape model or an analysis condition from the formula storage section 122 on the one hand, and calculates the scattering intensity of X-rays by selecting values of various parameters obtained from existing parameters on the other hand. The scattering intensity of X-rays scattered by a plate-shaped sample under the specific condition can be calculated by using the acquired formula.

Fitting a scattering intensity calculated by the intensity calculation section 125 to a scattering intensity of X-rays actually measured by the measurement device 110 is performed by the fitting section 126. The fitting section 126 confirms whether or not the fitting having been performed is optimum, and when not being optimum, the scattering intensity is made to be calculated again via simulation by changing parameters. The parameter determination section 127 determines the parameters of scattering bodies of a plate-shaped sample using the result obtained by fitting. In this manner, shapes of the scattering bodies that are long in the thickness direction can be determined.

[Measurement and Analysis Method]

Figure 8:
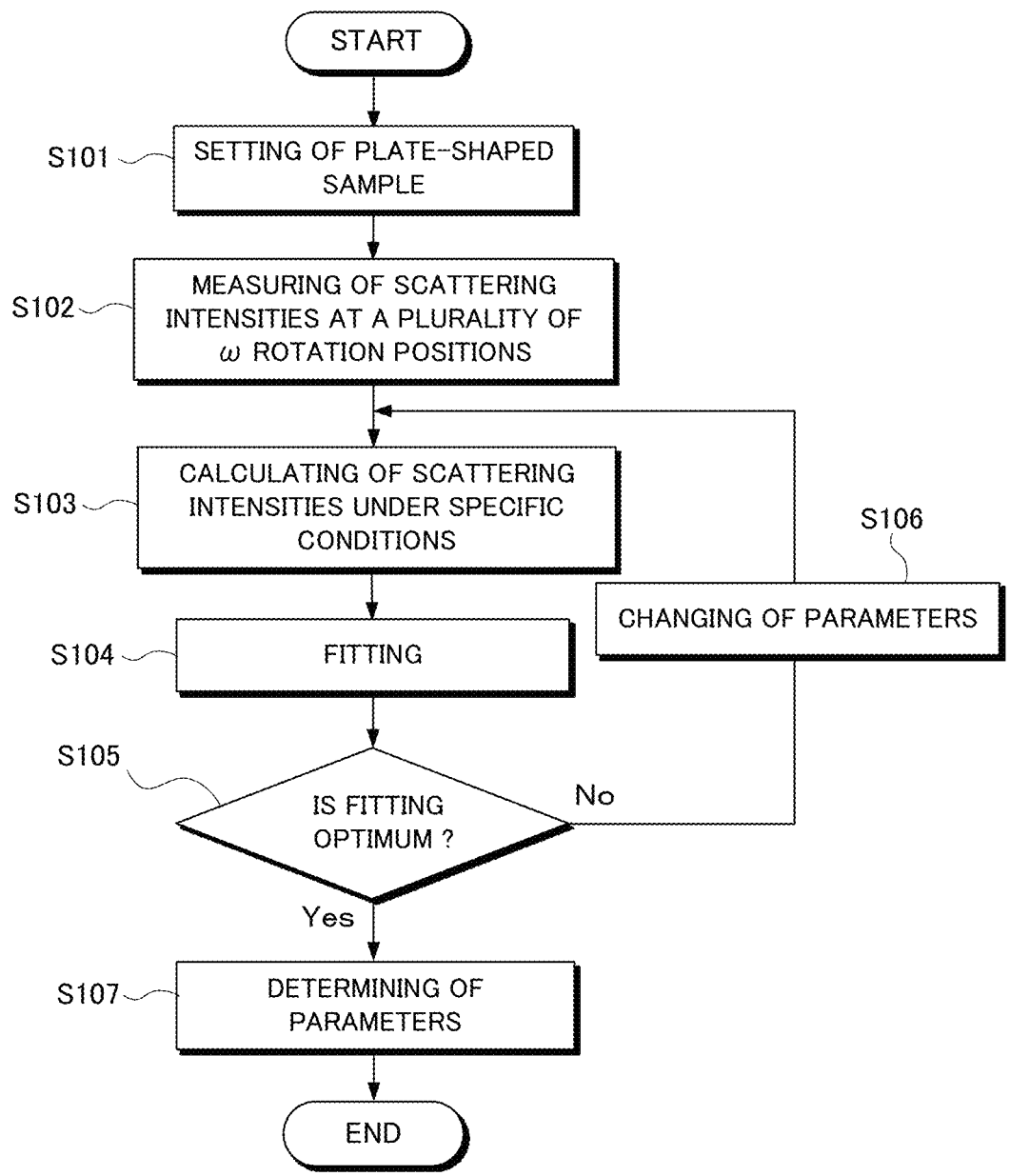
FIG. 8 is a flowchart showing a measurement and analysis method according to the present invention.

Next, described are a measurement and analysis method using a configuration of the above-described system. FIG. 8 is a flowchart showing the measurement and analysis method. As shown in FIG. 8, a plate-shaped sample is first set (step S101). Then, a scattering intensity at a plurality of ω rotation angles is measured (step S102).

On the other hand, the scattering intensity of X-rays is calculated by assuming physical parameters under a specific condition such as a specific shape model or a slice layer condition (step S103). Then, fitting the calculated scattering intensity to the measured scattering intensity is performed (step S104). Whether or not the fitting having been performed is optimum is confirmed (step S105); and when not being optimum, parameters are changed (step S106), followed by returning to step S103. When the fitting is optimum, the parameters are determined by values at that time (step S107), followed by stopping a series of procedures.

Example

As to a sample of a semiconductor substrate, to the surface of which holes long in the depth direction are periodically arranged in the parallel direction, the scattering intensity of X-rays was measured by transmission type CD-SAXS to specify patterns via model analysis and model-free analysis.

(Model Analysis)

Figure 9A:
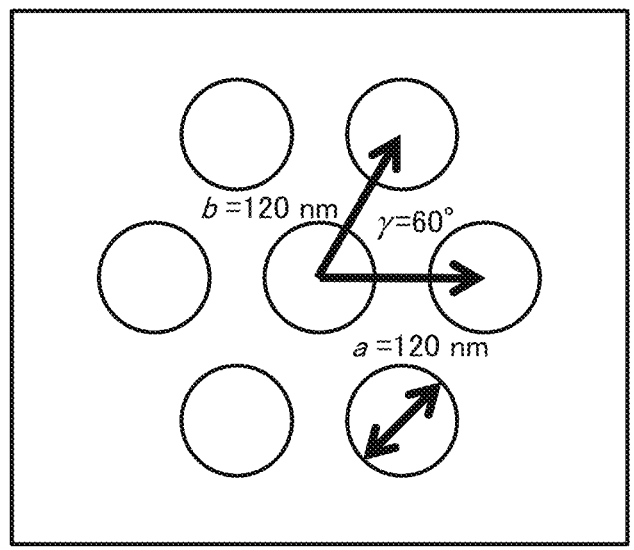
FIGS. 9A and 9B are a plane sectional view and a side sectional view showing specifications of an employed plate-shaped sample, respectively.
Figure 9B:
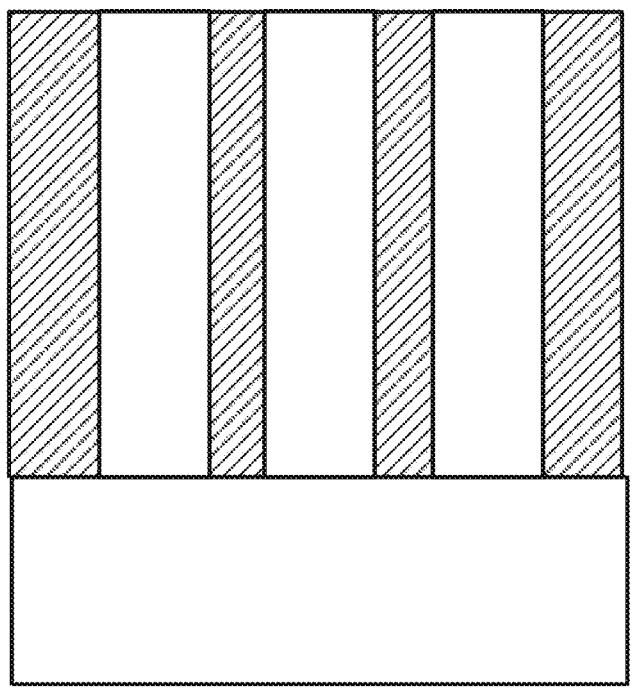

Parameters of the specific sample were determined by the model analysis. FIGS. 9A and 9B are a plane sectional view and a side sectional view showing specifications of the employed plate-shaped sample, respectively. As shown in FIGS. 9A and 9B, on a silicon substrate, used was the silicon substrate where holes each having a diameter of 80 nm, a depth of 3 μm at a lattice constant of a=b=120 nm and a lattice angle γ=60° were periodically formed.

Figure 10A:
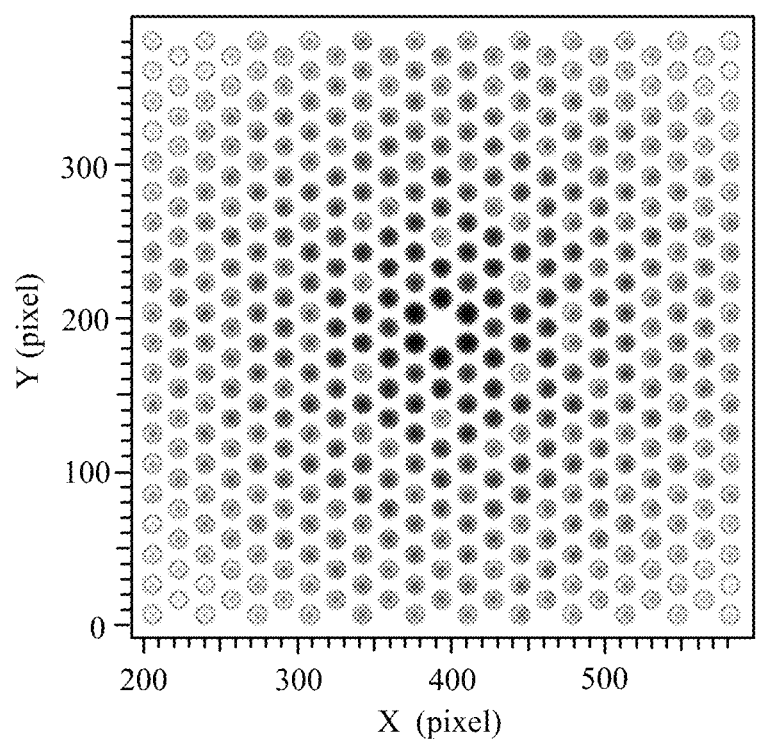
FIGS. 10A and 10B are diagrams showing measured scattering intensity data and a fitting result in the scattering vector $Q_R$ direction using a shape model, respectively.
Figure 10B:
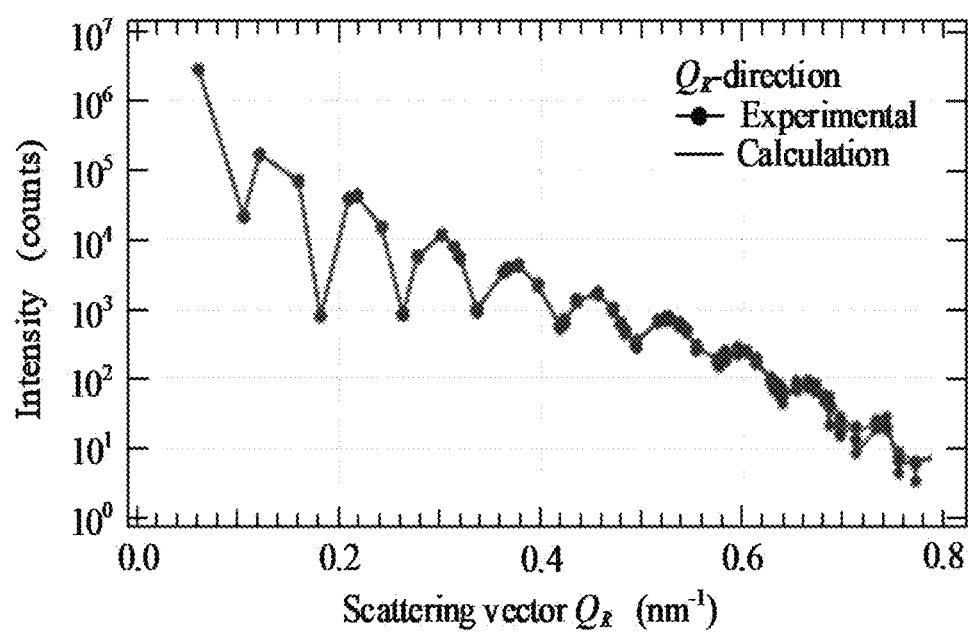

FIGS. 10A and 10B are diagrams showing measured scattering intensity data and a fitting result in the scattering vector $Q_R$ direction using a shape model, respectively. As shown in FIG. 10B, as to the $Q_R$ direction, the sufficient fitting result was obtained with respect to the actually measured data.

Figure 11A:
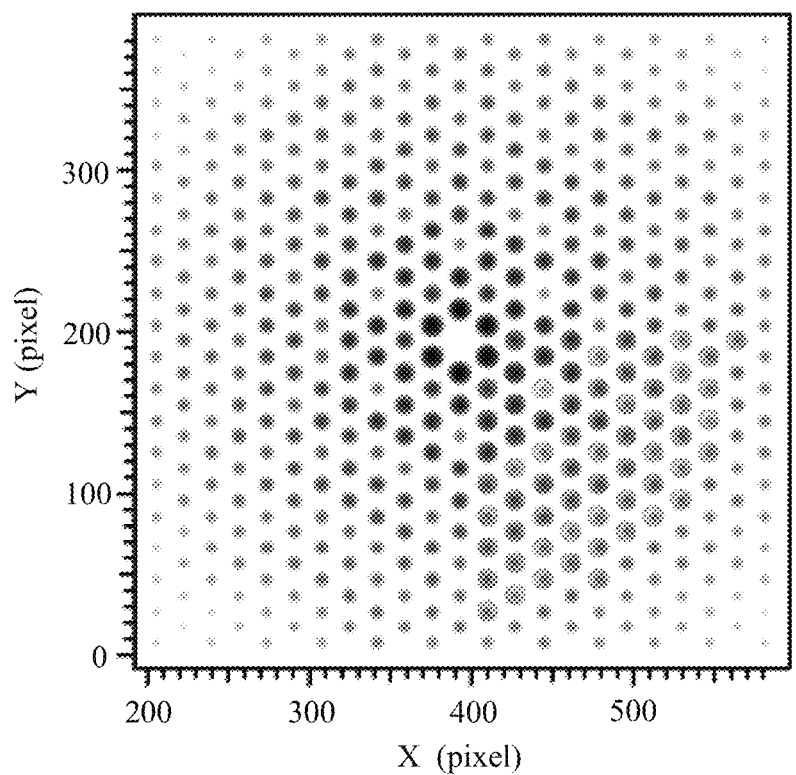
FIGS. 11A and 11B are diagrams showing measured scattering intensity data and a fitting result in the scattering vector $Q_Z$ direction using a shape model, respectively.
Figure 11B:
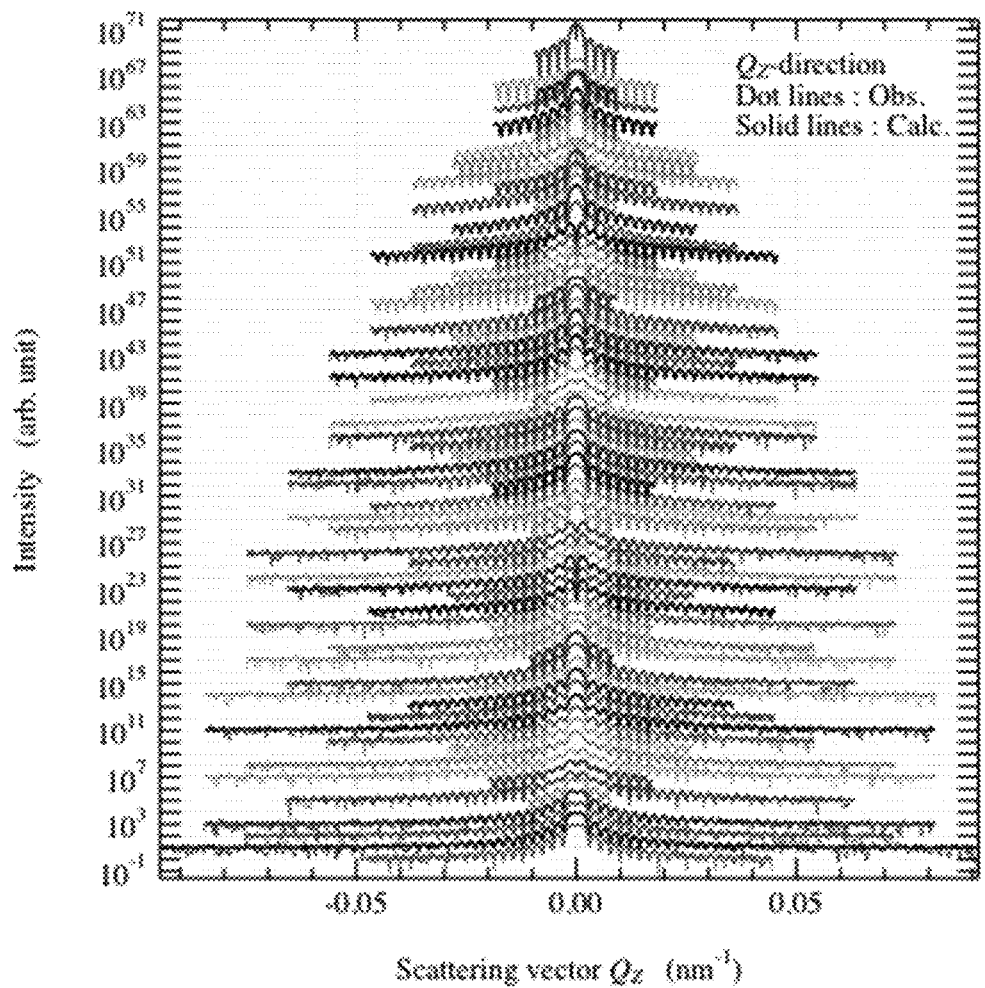

FIGS. 11A and 11B are diagrams showing measured scattering intensity data and a fitting result in the scattering vector $Q_Z$ direction using a shape model, respectively. As shown in FIG. 11B, as to the $Q_Z$ direction as well, the sufficient fitting result was obtained with respect to the actually measured data.

Figure 12:
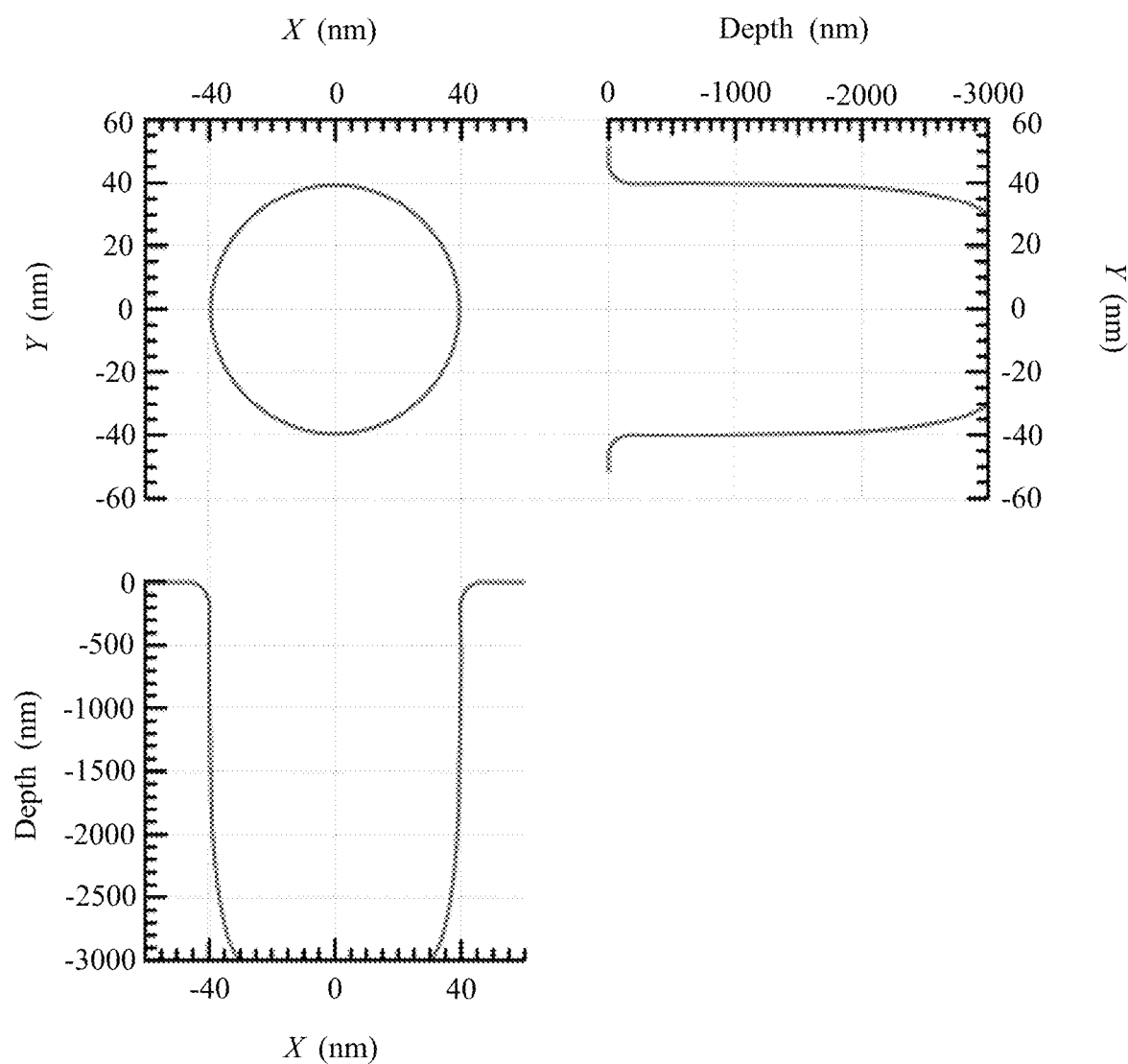
FIG. 12 is a diagram showing hole shapes obtained by using a shape model.

FIG. 12 is a diagram showing hole shapes obtained by using a shape model. Further, FIG. 13 is a table showing parameters of a pattern determined by using a shape model. As shown in FIG. 12 and FIG. 13, it was able to be generally confirmed that linear holes fitted to specification were formed. Further, it was also specified that curved surfaces were formed at the hole opening edge portion and at the hole bottom corner portion.

(Model-Free Analysis)

Figure 14A:
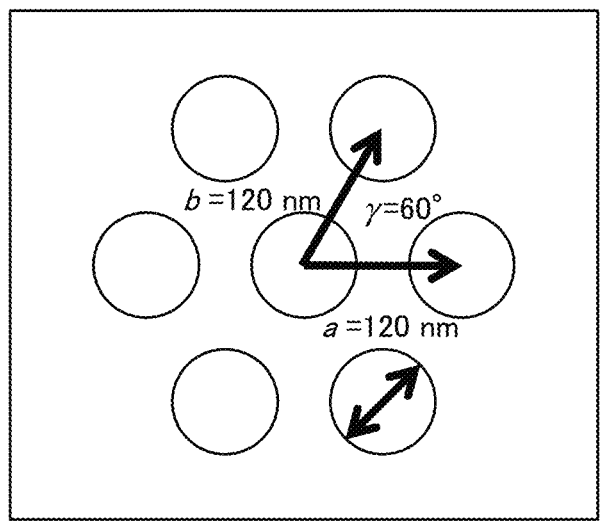
FIGS. 14A and 14B are a plane sectional view and a side sectional view showing specifications of an employed plate-shaped sample, respectively.
Figure 14B:
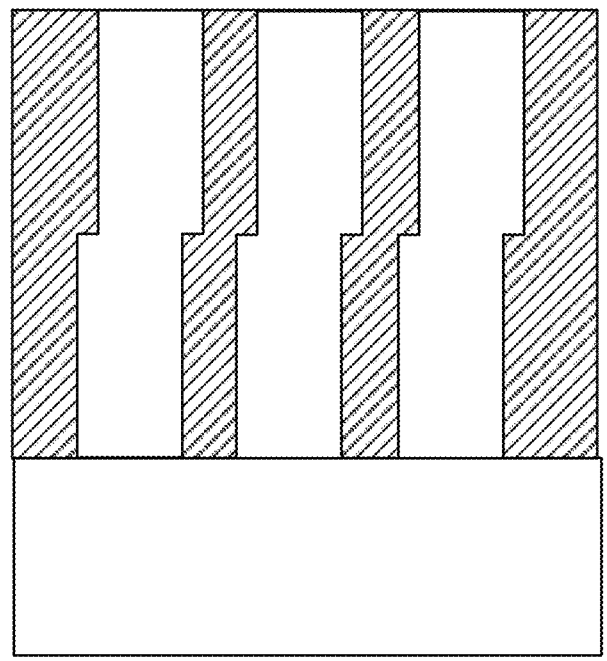

Hole shapes of the specific sample were specified by the model-free analysis. FIGS. 14A and 14B are a plane sectional view and a side sectional view showing specifications of the employed plate-shaped sample, respectively. As shown in FIGS. 14A and 14B, on a silicon substrate, used was the silicon substrate where holes each having a diameter of 80 nm, a depth of 3 μm at a lattice constant of a=b=120 nm and a lattice angle γ=60° were periodically formed. However, the holes have a level difference near a depth of 1.5 μm.

Figure 15A:
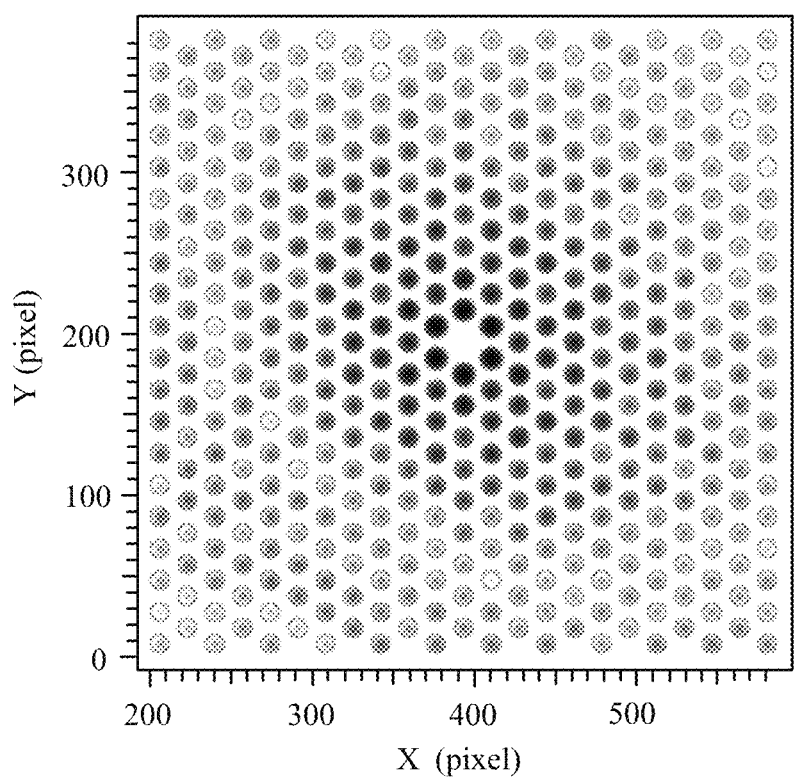
FIGS. 15A and 15B are diagrams showing measured scattering intensity data and a fitting result in the scattering vector $Q_R$ direction via model-free analysis, respectively.
Figure 15B:
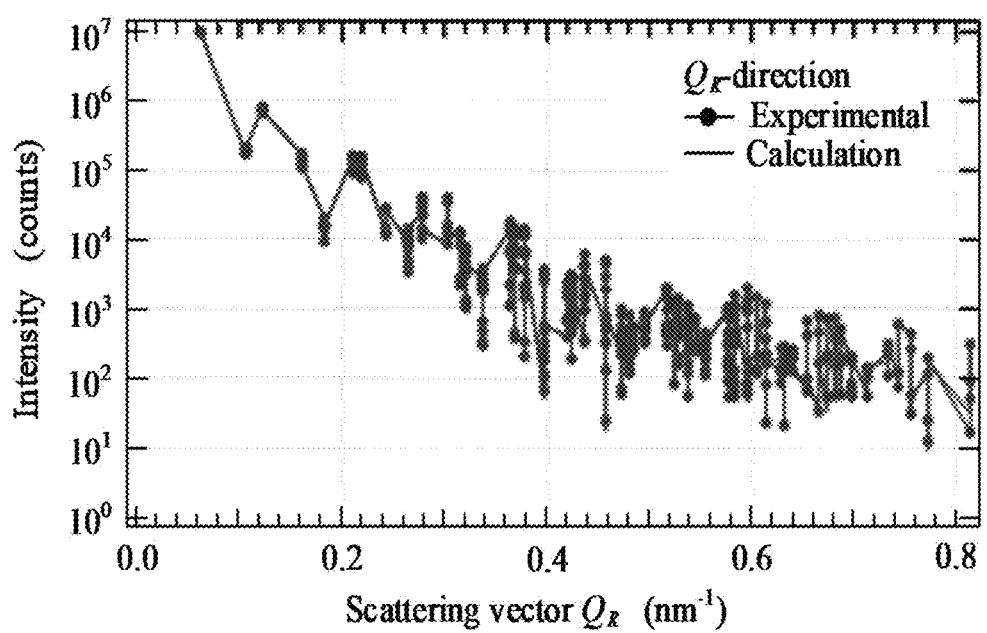

FIGS. 15A and 15B are diagrams showing measured scattering intensity data and a fitting result in the scattering vector $Q_R$ direction via model-free analysis, respectively. As shown in FIG. 15B, as to the $Q_R$ direction, the sufficient fitting result was obtained with respect to the actually measured data.

Figure 16A:
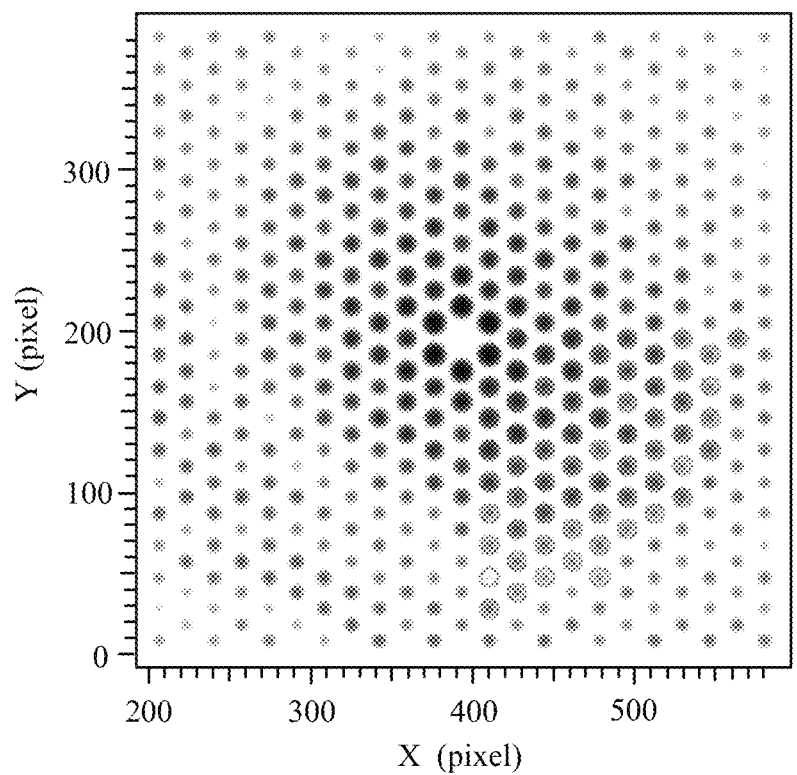
FIGS. 16A and 16B are diagrams showing measured scattering intensity data and a fitting result in the scattering vector $Q_Z$ direction via model-free analysis, respectively.
Figure 16B:
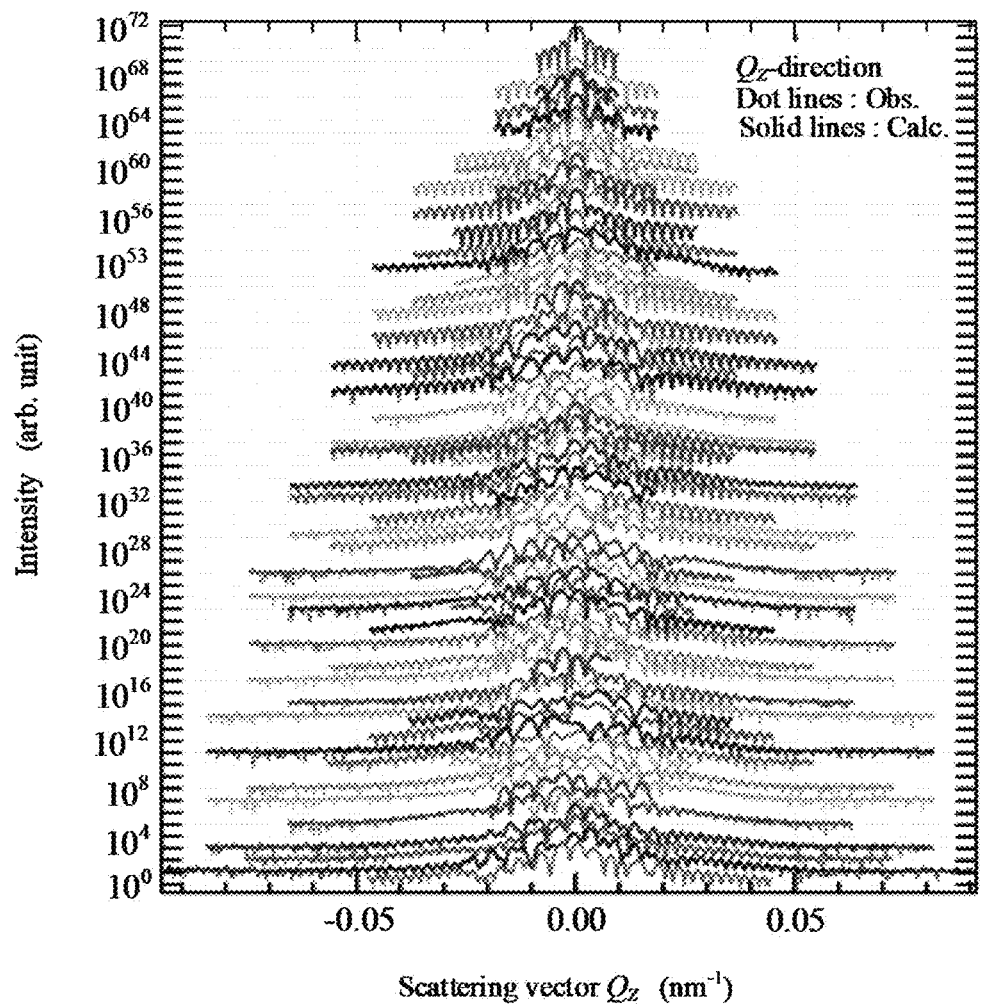

FIGS. 16A and 16B are diagrams showing measured scattering intensity data and a fitting result in the scattering vector $Q_Z$ direction via model-free analysis, respectively. As shown in FIG. 16B, as to the $Q_Z$ direction as well, the sufficient fitting result was obtained with respect to the actually measured data.

Figure 17A:
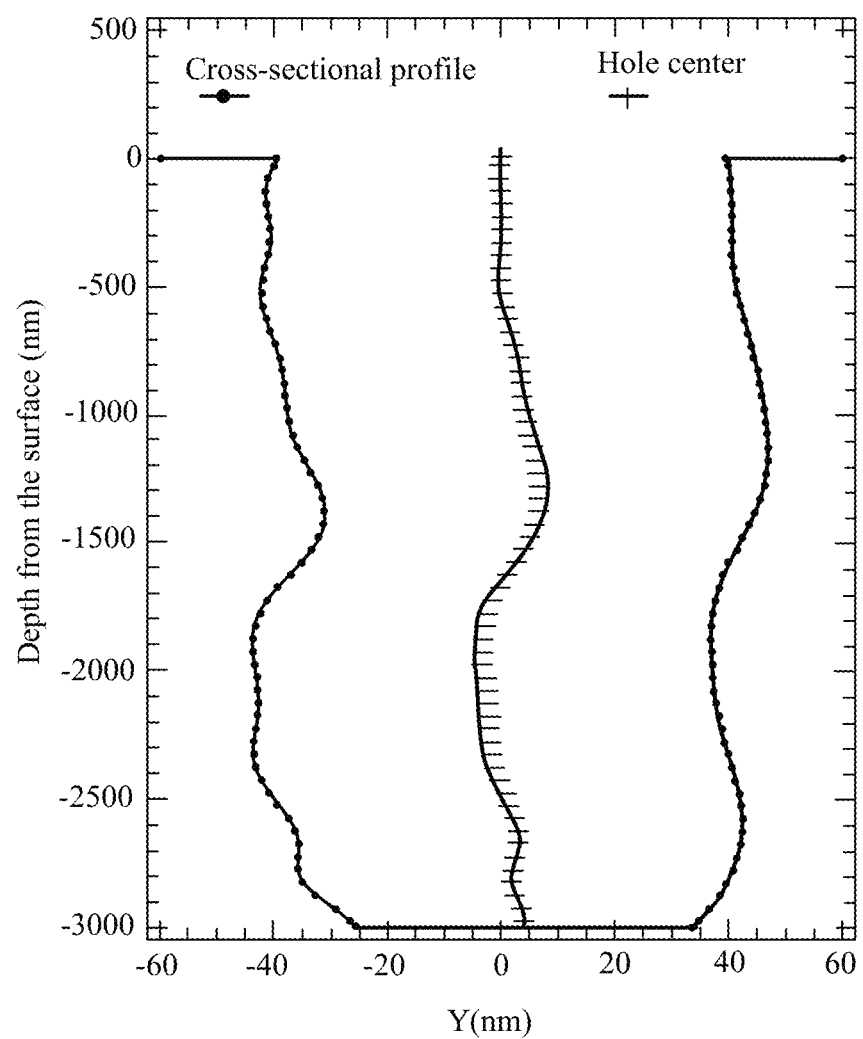
FIGS. 17A and 17B are an XZ sectional view and a YZ sectional view that show the resulting hole shapes, respectively.
Figure 17B:
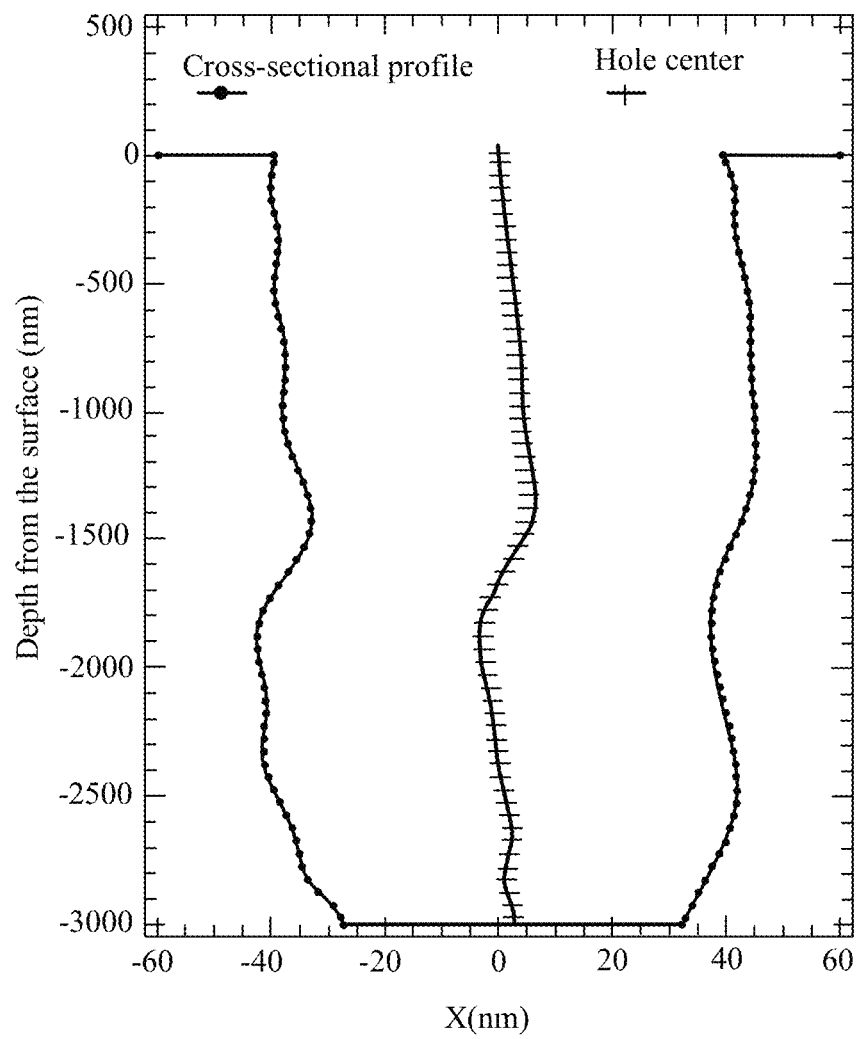
Figure 18A:
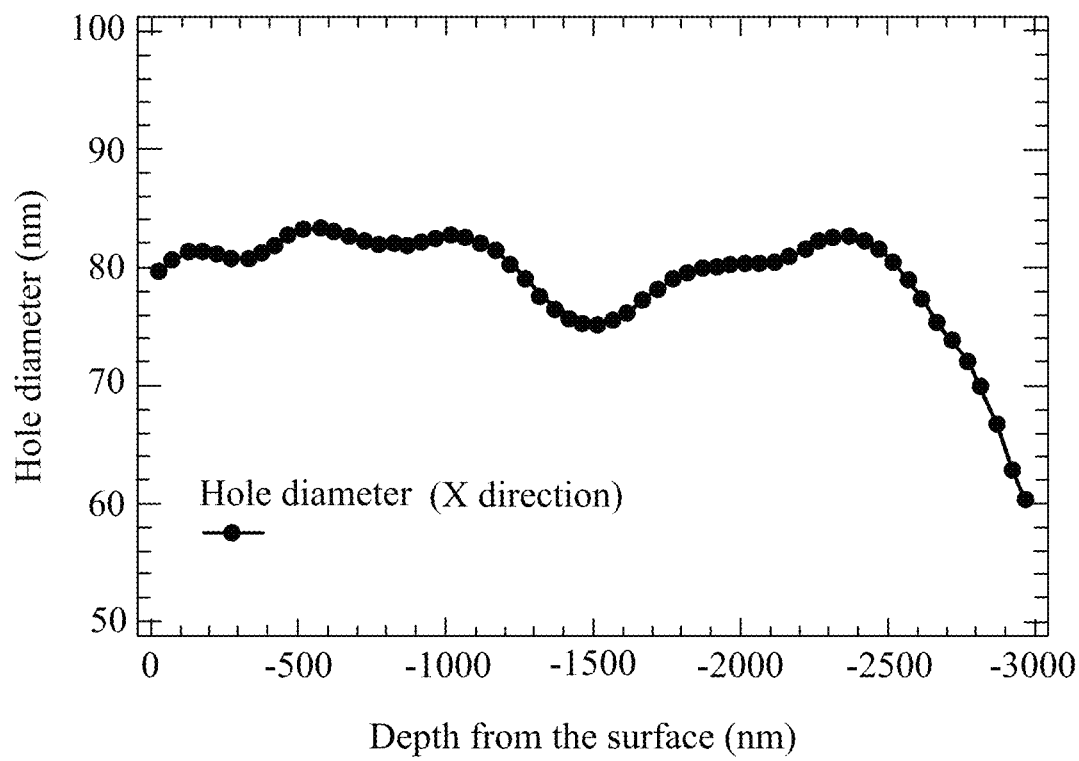
FIGS. 18A and 18B are diagrams showing the resulting hole diameters in the X direction and the Y direction with respect to the depth, respectively.
Figure 18B:
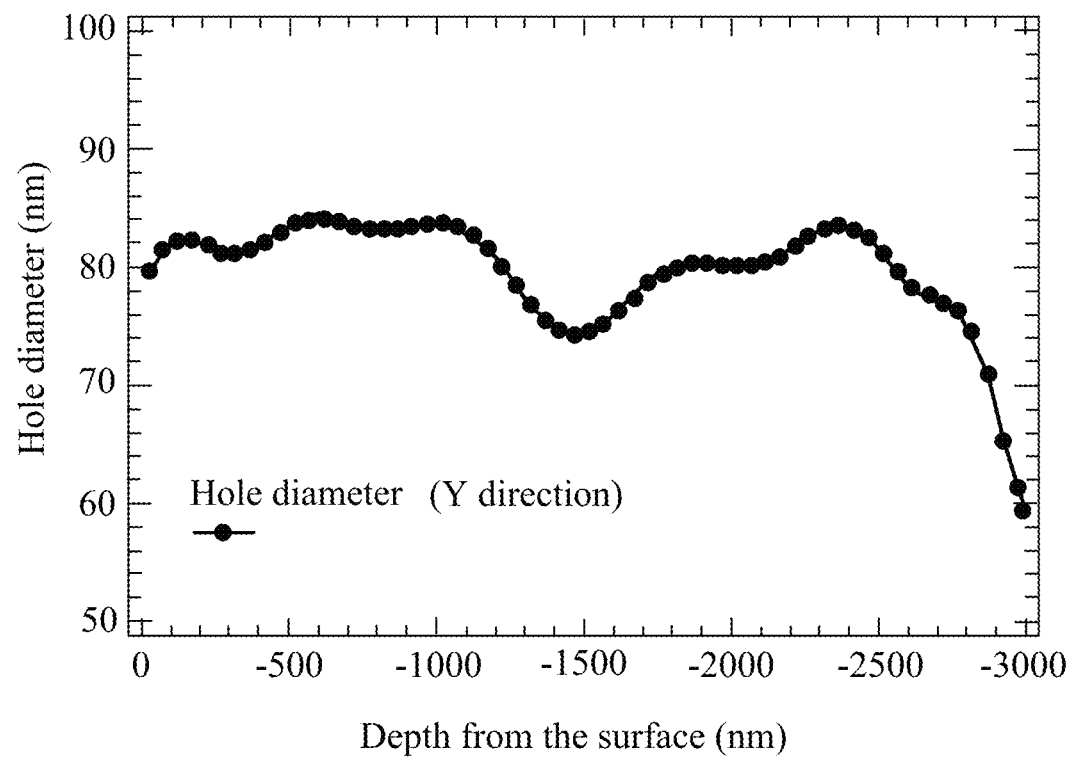

FIGS. 17A and 17B are an XZ sectional view and a YZ sectional view that show the resulting hole shapes, respectively. Further, FIGS. 18A and 18B are diagrams showing the resulting hole diameters in the X direction and the Y direction with respect to the depth, respectively. As shown in FIG. 17 and FIG. 18, it was able to be generally confirmed that linear holes having a level difference, that are fitted to specification, were formed. Further, it was able to be also specified that as to the hole, the diameter gradually became small toward the bottom, and the gently curved surface was formed.

EXPLANATION OF THE SYMBOLS

100 Measurement system
110 Measurement device
111 X-ray source
112 Mirror
115 Sample stand
116 Vacuum path
118 Beam stopper
119 Detector
120 Analysis apparatus
121 Control section
122 Formula storage section
123 Measurement data storage section
125 Intensity calculation section
126 Fitting section
127 Parameter determination section
S0 Plate-shaped sample
U1 Simple lattice
U2 Lattice
a, b Lattice constant
γ Lattice angle
ω Rotation angle

The invention claimed is:

1. An analysis method for a fine structure of a plate-shaped sample formed to have scattering bodies that are long in a thickness direction and periodically arranged, comprising the steps of:
    preparing data of a scattering intensity from the plate-shaped sample measured via transmission of X-rays at a plurality of ω rotation angles;
    calculating a scattering intensity of the X-rays scattered by the plate-shaped sample under specific conditions;
    fitting the calculated scattering intensity to the prepared scattering intensity; and
    determining shapes of the scattering bodies for the plate-shaped sample, based on a result of the fitting,
    wherein the prepared data is acquired by rotating the sample relative to a direction in which the X-rays are incident by each of the ω rotation angles, the direction perpendicular to the plane direction in which the scattering bodies are arranged being a reference for the X-ray incident direction, and
    the ω rotation angle is a rotation angle around the axis parallel to the plane on which the scattering bodies are arranged.

2. The analysis method according to claim 1,
    wherein the calculated scattering intensity of the X-rays is calculated by assuming a shape model in which the scattering bodies specified by parameters are periodically arranged in a direction parallel to a surface of the plate-shaped sample.

3. An analysis method for a fine structure of a plate-shaped sample formed to have scattering bodies that are long in a thickness direction and periodically arranged, comprising the steps of:
    preparing data of a scattering intensity from the plate-shaped sample measured via transmission of X-rays at a plurality of w rotation angles;

calculating a scattering intensity of the X-rays scattered by the plate-shaped sample under specific conditions;

fitting the calculated scattering intensity to the prepared scattering intensity; and determining shapes of the scattering bodies for the plate-shaped sample, based on a result of the fitting, wherein the calculated scattering intensity of the X-rays is calculated under a condition that the scattering bodies are formed by laminating layers having respective shapes in the thickness direction of the plate-shaped sample.

4. The analysis method according to claim 3,
wherein each layer of the scattering bodies is specified by a center position and a size of a cross-sectional shape.

5. The analysis method according to claim 3,
wherein the plate-shaped sample is formed from a multilayer film.

6. The analysis method according to claim 3,
wherein the fitting is performed under a constraint condition that adjacent layers among the layers are seamlessly connected with each other.

7. The analysis method according to claim 1,
wherein the plate-shaped sample is formed of silicon, and the scattering bodies each have a length of 200 nm or more and 20 µm or less.

8. An analysis apparatus for a fine structure of a plate-shaped sample formed to have scattering bodies that are long in a thickness direction and periodically arranged, comprising:

a measurement data storage section that stores data of a scattering intensity from the plate-shaped sample measured via transmission of X-rays at a plurality of $\omega$ rotation angles;

an intensity calculation section that calculates a scattering intensity of the X-rays scattered by the plate-shaped sample under specific conditions;

a fitting section that fits the calculated scattering intensity to the stored scattering intensity; and a parameter determination section that determines shapes of the scattering bodies for the plate-shaped sample, based on a result of the fitting, wherein the prepared data is acquired by rotating the sample relative to the direction in which the X-rays are incident by each of the co rotation angles, a direction perpendicular to the plane direction in which the scattering bodies are arranged being a reference for the X-ray incident direction, and the $\omega$ rotation angle is a rotation angle around the axis parallel to the plane on which the scattering bodies are arranged.

9. A non-transitory computer readable recording medium having recorded thereon an analysis program for a fine structure of a plate-shaped sample formed to have scattering bodies that are long in a thickness direction and periodically arranged, the program causing a computer to execute the processes of:

preparing data of a scattering intensity from the plate-shaped sample measured via transmission of X-rays at a plurality of $\omega$ rotation angles;

calculating a scattering intensity of the X-rays scattered by the plate-shaped sample under specific conditions;

fitting the calculated scattering intensity to the prepared scattering intensity; and determining shapes of the scattering bodies for the plate-shaped sample, based on a result of the fitting, wherein the prepared data is acquired by rotating the sample $\omega$ relative to the direction in which the X-rays are incident, with the direction perpendicular to the plane direction in which the scattering bodies are arranged as a reference for the X-ray incident direction, and the $\omega$ rotation angle is the rotation angle around the axis parallel to the plane on which the scattering bodies are arranged.

10. An analysis apparatus for a fine structure of a plate-shaped sample formed to have scattering bodies that are long in a thickness direction and periodically arranged, comprising:

a measurement data storage section that stores data of a scattering intensity from the plate-shaped sample measured via transmission of X-rays at a plurality of $\omega$ rotation angles;

an intensity calculation section that calculates a scattering intensity of the X-rays scattered by the plate-shaped sample under specific conditions;

a fitting section that fits the calculated scattering intensity to the stored scattering intensity; and a parameter determination section that determines shapes of the scattering bodies for the plate-shaped sample, based on a result of the fitting, wherein the calculated scattering intensity of the X-rays is calculated under a condition that the scattering bodies are formed by laminating layers having respective shapes in the thickness direction of the plate-shaped sample.

11. A non-transitory computer readable recording medium having recorded thereon an analysis program for a fine structure of a plate-shaped sample formed to have scattering bodies that are long in a thickness direction and periodically arranged, the program causing a computer to execute the processes of:

preparing data of a scattering intensity from the plate-shaped sample measured via transmission of X-rays at a plurality of $\omega$ rotation angles;

calculating a scattering intensity of the X-rays scattered by the plate-shaped sample under specific conditions;

fitting the calculated scattering intensity to the prepared scattering intensity; and determining shapes of the scattering bodies for the plate-shaped sample, based on a result of the fitting, wherein the calculated scattering intensity of the X-rays is calculated under a condition that the scattering bodies are formed by laminating layers having respective shapes in the thickness direction of the plate-shaped sample.

* * * * *